(12) United States Patent
Teruyama

(10) Patent No.: US 8,032,663 B2
(45) Date of Patent: Oct. 4, 2011

(54) INFORMATION PROCESSING SYSTEM, INFORMATION PROCESSING APPARATUS AND INTEGRATED CIRCUIT CHIP

(75) Inventor: Katsuyuki Teruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 1170 days.

(21) Appl. No.: 11/724,214

(22) Filed: Mar. 15, 2007

(65) Prior Publication Data

US 2007/0223521 A1   Sep. 27, 2007

(30) Foreign Application Priority Data

Mar. 27, 2006 (JP) ................... 2006-086188
May 31, 2006 (JP) ................... 2006-151435

(51) Int. Cl.
 *G06F 3/00* (2006.01)
 *G06F 13/28* (2006.01)
 *G06F 13/00* (2006.01)
(52) U.S. Cl. ................. 710/5; 710/24; 710/30
(58) Field of Classification Search ............... 710/5, 24, 710/30
See application file for complete search history.

(56) References Cited

U.S. PATENT DOCUMENTS

| 7,043,578 B2 * | 5/2006 | Hufferd ............. 710/105 |
| 2003/0140150 A1 * | 7/2003 | Kemp et al. .......... 709/229 |
| 2006/0218196 A1 * | 9/2006 | Kurita ............. 707/200 |

FOREIGN PATENT DOCUMENTS

| JP | 01-175431 | 7/1989 |
| JP | 05-020160 | 1/1993 |
| JP | 09-179949 | 7/1997 |
| JP | 2005-196411 | 7/2005 |

OTHER PUBLICATIONS

Japanese Office Action dated May 7, 2008 for corresponding Japanese Application No. 2006-151435.

* cited by examiner

*Primary Examiner* — Alford Kindred
*Assistant Examiner* — Zachary K Huson
(74) *Attorney, Agent, or Firm* — Rader, Fishman & Grauer PLLC

(57) ABSTRACT

There is provided an information processing system that includes an integrated circuit chip having stored therein a plurality of file systems, a first information processing apparatus that engages in communication with the integrated circuit chip and a second information processing apparatus that engages in communication with the first information processing apparatus. The first information processing apparatus includes a command packet linking unit that generates a single linked command packet by linking a second command packet generated by the second information processing apparatus within a first command packet and a first command packet transmission unit that transmits the linked command packet to the integrated circuit chip to be directed to the plurality of file systems. The second information processing apparatus includes a second command packet generation unit that generates the second command packet and a second command packet transmission unit that transmits the second command packet to the first information processing apparatus.

23 Claims, 24 Drawing Sheets

FIG.5

| NAME | DESCRIPTION |
|---|---|
| PREAMBLE | PACKET PREAMBLE |
| SYNC | SYNCHRONIZATION DATA |
| LEN_A | LENGTH OF THE ENTIRE PACKET (PACKET_DATA) |
| LEN_B | LENGTH OF PACKET FOR FILE SYSTEM B |
| CRC | CHECK CODE FOR COMMUNICATION ERROR DETECTION |
| | |
| CMD_A | COMMAND FOR FILE SYSTEM A (WritePlus/ReadPlus) |
| CMD_B | COMMAND FOR FILE SYSTEM B (Write/Read) |
| IDtc_A/B | BYTE STRING USED FOR FILE SYSTEM A/B IDENTIFICATION |
| PARAM_A/B | COMMAND:<br>TARGET DATA ADDRESS IN FILE SYSTEM A/B AND DATA TO BE WRITTEN |
| | RESPONSE:<br>COMMAND PROCESSING RESULTS AND DATA HAVING BEEN READ OUT |

RESULTS

| NAME | DESCRIPTION |
|---|---|
| LEN | PACKET LENGTH |
| IDtc | BYTE STRING USED FOR SYSTEM IDENTIFICATION |
| NB | NUMBER OF SETS OF DATA TO BE WRITTEN |
| BList | ADDRESSES OF DATA BEING WRITTEN |
| SF | WRITE PROCESSING RESULTS |
| BData | DATA TO BE WRITTEN |

FIG.11

| NAME | DESCRIPTION |
|------|-------------|
| LEN | PACKET LENGTH |
| IDtc | BYTE STRING USED FOR SYSTEM IDENTIFICATION |
| NB | NUMBER OF SETS OF DATA TO BE READ OUT |
| BList | ADDRESSES OF DATA BEING READ OUT |
| SF | READ PROCESSING RESULTS |
| BData | DATA READ OUT |

INFORMATION PROCESSING SYSTEM, INFORMATION PROCESSING APPARATUS AND INTEGRATED CIRCUIT CHIP

BACKGROUND OF THE INVENTION

1. Field of the Invention

The present invention relates to an information processing system, an information processing apparatus and an integrated circuit chip, and more specifically, it relates to a technology to be adopted when writing to the memories (system internal memories) in a plurality of file systems present within an integrated circuit chip (IC card) in response to a single command, through which the previous state is held by restoring each system internal memory having been overwritten to the pre-overwrite state if a condition, such as a power-down, which disables the overwrite of some of the system internal memories, occurs.

2. Description of the Related Art

In an information processing system realized in conjunction with an IC card, file systems each corresponding to a specific service provider may be assigned in a single memory area of the IC card so as to allow the single IC card to be shared by a plurality of providers (see, for instance, Japanese Patent Laid-open Publication No. JP-A-2005-196411). An example of a structure that may be adopted in an IC card used in such an information processing system is explained in reference to FIG. 25. As shown in FIG. 25, internal access to file systems 710 and 720 in an IC card 700 is managed individually via a memory management system, whereas access by an external communication packet is managed through an encrypted communication function. A device (Reader/Writer) that reads data from and writes data to the IC card 700 transmits to the IC card 700 commands, individually encrypted each in correspondence to one of the file systems 710 and 720, as command packets, and the commands are processed in the individual file systems 710 and 720 in the IC card 700.

While overwriting a plurality of system internal memories in response to a single command within an IC card containing a plurality of file systems, a condition, such as power-out that disables an overwrite of some of the system internal memories may occur. Under such circumstances, a roll-back in a single file system in the IC card is assured, but a roll-back over a plurality of file systems is not assured in the related art. This, in turn, leads to fragmentation of the processing executed in the IC card, and since the extent of the roll-back varies among application programs, the Reader/Writer or the host controller may be required to execute complex processing.

SUMMARY OF THE INVENTION

The above problem is addressed in the art disclosed in Japanese Patent Application JP 2006-24673 filed in the Japanese Patent Office on Feb. 1, 2006 by the assignee of the present application. The art disclosed in the application is now outlined with reference to FIG. 26. A controller C840 in FIG. 26 controls command packets transmitted from a controller A820 and a controller B830 to an IC card 810. A Reader/Writer 850 at the controller C840 transmits a single command packet containing a plurality of command packets linked in series to a plurality of file systems in the IC card 810.

The single command packet received at the IC card 810 is separated into individual command packets, which are then transferred to the corresponding file systems. In addition, a plurality of response packets from the plurality of file systems is linked in series in the IC card 810, and the linked response packets are transmitted as a single response packet to the Reader/Writer 850. This structure enables an update of management data used in all the systems after verifying that the processing in the individual file systems has been completely finished. Japanese Patent Application No. 2006-24673 discloses a method of linking a plurality of existing memory read/write commands and transmitting the linked commands as a single command so as to access a plurality of system internal memories in an IC card containing a plurality of file systems with a single command. However, there is a concern that switching of a packet may occur as packets are exchanged through this method. For instance, when a command is transmitted from the controller C840, a third party may replace a write command for the file system A to update another memory with the packet corresponding to the file system A.

Accordingly, it is desirable to further improve the technique described above, and more specifically, to provide a new and improved information processing system, a new and improved information processing apparatus and a new and improved integrated circuit chip, all adopting more cost-effective structures, which eliminate the risk of a third party replacing the contents of a transmitted packet with false contents when a plurality of system internal memories in an integrated circuit chip containing a plurality of file systems is accessed with a single command.

According to an embodiment of the present invention, there is provided an information processing system including an integrated circuit chip having stored therein a plurality of file systems, a first information processing apparatus that engages in communication with the integrated circuit chip and processes information and a second information processing apparatus that engages in communication with the first information processing apparatus and processes information. The first information processing apparatus in the information processing system according to the present embodiment includes a first command packet generation unit that generates a first command packet, a command packet linking unit that generates a single linked command packet by linking a second command packet generated by the second information processing apparatus within the first command packet and a first command packet transmission unit that transmits the linked command packet to the integrated circuit chip to be directed to the plurality of file systems therein. The second information processing apparatus includes a second command packet generation unit that generates the second command packet and a second command packet transmission unit that transmits the second command packet to the first information processing apparatus.

This information processing system enables a controller in charge of a given file system to encrypt and transmit command's in a batch when the plurality of system internal memories in the integrated circuit chip containing a plurality of file systems are to be accessed with a single command. Unlike the structural example (see FIG. 26) of the related art, the structure may not require a controller exclusively used to link packets. In other words, since the system may require two controllers instead of three controllers, a significant advantage is achieved with regard to cost.

The information processing system according to the present embodiment allows for various applications. For instance, the first command packet may contain a first command to access a first file system in the integrated circuit chip, the second command packet may contain a second command to access a second file system in the integrated circuit chip and the second command may be embedded as a parameter in the first command within the linked command packet. Since the second command is embedded as a parameter in the first command within the linked command packet in this structure, the risk of a third party switching the contents of a transmitted packet is eliminated.

In the integrated circuit chip, the single linked command packet containing the first and second command packets linked therein can be separated into the individual command packets, which are then transferred to the corresponding file systems, and a plurality of response packets from the plurality of file systems can be linked into a single linked response packet. The first response packet may contain a first response from the first file system, the second response packet may contain a second response from the second file system and the second response may be embedded as a parameter in the first response within the linked response packet. Since the second response is embedded as a parameter in the first response within the linked response packet in this structure, the risk of a third party switching the contents of a transmitted packet is eliminated.

The integrated circuit chip may be mounted at an IC card or a data processing apparatus (a portable telephone, a PDA or the like). Various types of services can be provided as business through IC cards, portable telephones and the like that are used widely today and the use of which is expected to become even more widespread in the future.

According to an embodiment of the present invention, there is provided an information processing apparatus that engages in communication with an integrated circuit chip having stored therein a plurality of file systems and processes information that is provided in the present embodiment. The information processing apparatus according to the present embodiment includes a command packet generation unit that generates a first command packet, a command packet linking unit that generates a single linked command packet by linking a second command packet, having been generated by and transmitted from another information processing apparatus, within the first command packet and a command packet transmission unit that transmits the linked command packet to the integrated circuit chip to be directed to the plurality of file systems therein.

The structure adopted in the information processing apparatus enables a controller in charge of a given file system to encrypt and transmit commands in a batch when the plurality of system internal memories in the integrated circuit chip containing a plurality of file systems is to be accessed with a single command. Unlike the structural example (see FIG. 26) of the related art, the structure may not require a controller used exclusively to link packets.

The information processing apparatus according to an embodiment of the present invention allows for various applications. For instance, the first command packet may contain a first command to access a first file system in the integrated circuit chip, the second command packet may contain a second command to access a second file system in the integrated circuit chip and the second command may be embedded as a parameter in the first command within the linked command packet. Since the second command is embedded as a parameter in the first command within the linked command packet in this structure, the risk of a third party switching the contents of a transmitted packet is eliminated.

In addition, the integrated circuit chip may be mounted at an IC card or a data processing apparatus (a portable telephone, a PDA or the like). Various types of services can be provided as business through IC cards, portable telephones and the like that are used widely today and the use of which is expected to become even more widespread in the future.

According to an embodiment of the present invention, there is provided an integrated circuit chip equipped with a memory where a plurality of file systems are stored. The integrated circuit chip according to the present embodiment includes a memory which includes a plurality of system areas where the first and second file systems are stored and a system coordination data area where management data to be used for all the file systems are stored and a control unit that controls data in the first and second file systems based upon the system coordination data. The control unit separates a single command packet, achieved by linking a first command packet and a second command packet corresponding to the first file system and the second file system respectively, into the individual command packets, transfers the separated command packets to the corresponding file systems, and creates a single linked response packet by linking a plurality of response packets from the first and second file systems. The first response packet contains a first response from the first file system, the second response packet contains a second response from the second file system and the second response is embedded as a parameter in the first response within the linked response packet.

The structure adopted in the integrated circuit chip enables a controller in charge of a given file system to encrypt and transmit commands in a batch when the plurality of system internal memories are to be accessed with a single command. Unlike the structural example (see FIG. 26) of the related art, the structure may not require a controller used exclusively to link packets. In addition, since the second response is embedded as a parameter in the first response within the linked response packet in this structure, the risk of a third party switching the contents of a transmitted packet is eliminated.

The integrated circuit chip according to an embodiment of the present invention allows for various applications. For instance, the file systems may each include a system internal memory where the data in the corresponding file system are stored, a memory management unit that manages the system internal memory, a command processing unit that accesses the system internal memory via the memory management unit (executes memory access processing) and sets response data in the response packet, and an encryption processing unit that executes an encryption processing (encryption processing•decryption processing) on the command packet and the response packet.

In addition, the control unit is capable of updating the management data for all the systems stored in the system coordination data area (executing memory access commit processing) in response to, for instance, first and second response packets from the first and second file systems, respectively.

In addition, access to any of the plurality of file systems by another file system among the plurality of file systems can be disallowed. By disallowing such mutual access, a service business offering services by a plurality of service providers (service operators) can be created through the use of the integrated circuit chip. Namely, the structure allows the service providers to create their own separate file systems, and the various services being offered can be contained in a single IC card so as to assure a safe billing and payment service by coordinating the individual services.

According to an embodiment of the present invention, there is provided an information processing system including an integrated circuit chip having stored therein a plurality of file systems, a first information processing apparatus that engages in communication with the integrated circuit chip and processes information, a second information processing apparatus that engages in communication with the first information processing apparatus and processes information, and a third information processing apparatus that engages in communication with the second information processing apparatus and processes information. The first through third information processing apparatuses in the information processing system are connected in series.

Namely, the first information processing apparatus includes a first command packet generation unit that generates a first command packet, a command packet linking unit that generates a single linked command packet by linking a second command packet generated by the second information processing apparatus within the first command packet, and a first command packet transmission unit that transmits the linked command packet to the integrated circuit chip to be directed to the plurality of file systems therein. The second information processing apparatus includes a second command packet generation unit that generates the second command packet a command packet linking unit that generates a single linked command packet by linking a third command packet generated by the third information processing apparatus within the second command packet, and a second command packet transmission unit that transmits the linked command packet to the first information processing apparatus. The third information processing apparatus includes a third command packet generation unit that generates the third command packet, and a third command packet transmission unit that transmits the third command packet to the second information processing apparatus.

According to an embodiment of the present invention, there is provided an information processing system including an integrated circuit chip having stored therein a plurality of file systems, a first information processing apparatus that engages in communication with the integrated circuit chip and processes information, and second and third information processing apparatuses that engage in communication with the first information processing apparatus and process information. The first through third information processing apparatuses in this information processing system are connected in parallel.

Namely, the first information processing apparatus includes a first command packet generation unit that generates a first command packet, a command packet linking unit that generates a single linked command packet by linking a second command packet and a third command packet respectively generated by the second information processing apparatus and the third information processing apparatus within the first command packet, and a first command packet transmission unit that transmits the linked command packet to the integrated circuit chip to be directed to the plurality of file systems therein. The second information processing apparatus includes a second command packet generation unit that generates the second command packet and a second command packet transmission unit that transmits the second command packet to the first information processing apparatus. The third information processing apparatus includes a third command packet generation unit that generates the third command packet and a third command packet transmission unit that transmits the third command packet to the first information processing apparatus.

According to an embodiment of the present invention, there is provided an information processing system including an integrated circuit chip having stored therein a plurality of file systems, a first information processing apparatus that engages in communication with the integrated circuit chip and processes information, and a kth information processing apparatus (k is an integer equal to or greater than 2 and equal to or less than n, and n is an integer equal to or greater than 2) that engages in communication with a k−1th information processing apparatus and processes information. The first through nth information processing apparatuses in this information processing system are connected in series.

Namely, the first information processing apparatus includes a first command packet generation unit that generates a first command packet, a command packet linking unit that generates a single linked command packet by linking a second command packet generated by the second information processing apparatus within the first command packet, and a first command packet transmission unit that transmits the linked command packet to the integrated circuit chip to be directed the plurality of file systems therein. The kth information processing apparatus (k is an integer equal to or greater than 2 and equal to or less than n−1) includes a kth command packet generation unit that generates a kth command packet, a command packet linking unit that generates a single linked command packet by linking a k+1th command packet generated by a k+1 th information processing apparatus within the kth command packet, and a kth command packet transmission unit that transmits the linked command packet to the k−1th information processing apparatus, the nth information processing apparatus includes an nth command packet generation unit that generates an nth command packet and an nth command packet transmission unit that transmits the nth command packet to an n−1th information processing apparatus.

According to an embodiment of the present invention, there is provided an information processing system including an integrated circuit chip having stored therein a plurality of file systems, a first information processing apparatus that engages in communication with the integrated circuit chip and processes information and second through nth information processing apparatuses (n is an integer equal to or greater than 2) that engage in communication with the first information processing apparatus and process information. The first through nth information processing apparatuses in this information processing system are connected in parallel.

Namely, the first information processing apparatus includes a first command packet generation unit that generates a first command packet, a command packet linking unit that generates a single linked command packet by linking second through nth command packets respectively generated by the second through nth information processing apparatuses within the first command packet, and a first command packet transmission unit that transmits the linked command packet to be directed to the integrated circuit chip the plurality of file systems therein. A kth information processing apparatus (k is an integer equal to or greater than 2 and equal to or less than n) includes a kth command packet generation unit that generates a kth command packet and a kth command packet transmission unit that transmits the kth command packet to the first information processing apparatus.

In yet another embodiment of the present invention, a program that enables a computer to function as an information processing apparatus according to an embodiment of the present invention and a computer-readable recording medium having the program recorded therein are provided. The program may be written in any programming language. In addition, the recording medium may be any of the recording media that allow programs to be recorded therein that are in regular use at present or that may be used in the future, such as CD-ROMs, DVD ROMs and flexible disks. The program, recorded on a specific recording medium, can be distributed in the market or it may be distributed by way of download via an electronic network.

As described above, the present invention eliminates the risk of a third party switching the contents of a transmitted packet when a plurality of system internal memories in an integrated circuit chip containing a plurality of file systems is being accessed with a single command through a structure achieving good cost performance.

BRIEF DESCRIPTION OF THE DRAWINGS

FIG. 5 presents a table describing the packet elements;

FIG. 11 explains the packet elements;

DETAILED DESCRIPTION OF THE PREFERRED EMBODIMENTS

Figure 1:
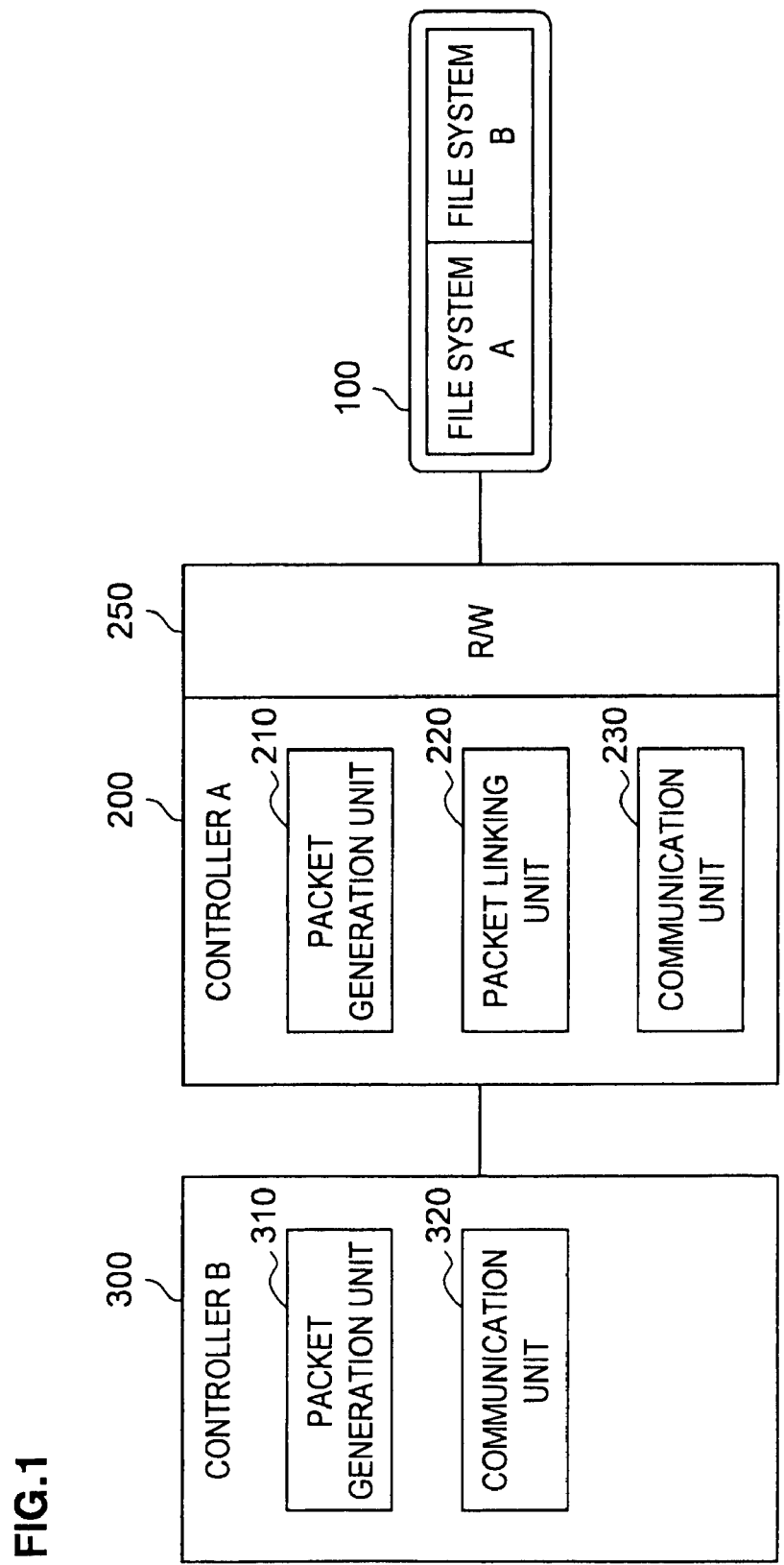
FIG. 1 illustrates the information processing system achieved in an embodiment of the present invention.

The following is a detailed explanation of the embodiments of the information processing system, the information processing apparatus and the integrated circuit chip according to the present invention, given in reference to the attached drawings. It is to be noted that in the description and the drawings, the same reference numerals are assigned to components having substantially identical functions and structural features to preclude a repeated explanation thereof.

First Embodiment (1) System Configuration (FIG. 1)

FIG. 1 illustrates the configuration of the information processing system achieved in the embodiment.

The information processing system in the embodiment includes an IC card 100, a controller A200 equipped with a Reader/Writer (R/W) 250 and a controller B300, as shown in FIG. 1. The following is an explanation of each component constituting the system.

The IC card 100 may be a card-type data communication device or it may be an integrated circuit chip with an IC card function built into an information communication terminal device (data processing device), such as a portable telephone. The term "IC card" may be used in the description for the purpose of convenience regardless of whether the IC card is built into a device or detachably loaded in the device. In addition, the integrated circuit chip with an IC card function, which may be loaded in a portable terminal such as a portable telephone or a PDA, or in an information processing terminal such as a personal computer (PC), engages in data communication with an external device. In this case, the integrated circuit chip includes an interface for external device connection as well as an interface via which a wired or wireless connection with the Reader/Writer device is enabled.

(IC Card 100)

At least one file system is stored in the IC card 100. An explanation is given in reference to the embodiment by assuming that two file systems (to be referred to as file system A and file system B) are stored in the IC card, and thus, in correspondence to the file systems, two controllers (a controller A200 and a controller B300) are included in the information processing system.

The IC card 100 executes the processing corresponding to a command contained in a packet received via the Reader/Writer 250, e.g., data read from or data write into memory. The file systems A and B are not allowed to access each other. Namely, it is incapable of accessing the file system B from the controller A and it is incapable of accessing the file system A from the controller B. The structure of the IC card 100 is to be described in further detail later in reference to FIGS. 2 and 3.

(Controller A200)

As shown in FIG. 1, the controller A200 includes a packet generation unit 210 that generates a command packet to be transmitted to the IC card 100 in relation to the file system A in the IC card 100, a command packet linking unit 220 that generates a single command packet by linking the command packet generated by the packet generation unit 210 and a command packet generated by the controller B300 and a communication unit 230 that engages in communication with the IC card 100 and the controller B300. The command packet linking unit 220 is described in further detail later in reference to FIGS. 4 and 5.

The components shown in FIG. 1 may further include various other means not shown in the figure. For instance, the information processing system may include a means for generating and holding a key to be used when accessing the file system A in the IC card 100, a means for issuing a request to the controller B300 for a command for accessing the file system B and issuing a request to the controller B300 for processing to be executed as a response to the results of the access, a means for making a decision as to whether or not processing has ended normally by checking a packet received from the IC card 100, a means for controlling the entire controller A200 and the like.

The controller A200 is equipped with the Reader/Writer 250 which engages in direct communication with the IC card 100. The Reader/Writer 250 has a function of reading out data recorded in the IC card 100 and writing data into the IC card 100 through direct communication with the IC card 100. The data communication between the IC card 100 and the Reader/Writer 250 is achieved through wireless communication executed based upon, for instance, the principal of electromagnetic induction. The Reader/Writer 250 and the controller A200 may constitute an integrated unit, or they may be isolated from each other over a space or connected via a cable or the like.

(Controller B300)

As shown in FIG. 1, the controller B300 includes a packet generation unit 310 that generates a command packet to be transmitted to the IC card 100 in relation to the file system B in the IC card 100 and a communication unit 320 that engages in communication with the controller A200. In response to a request from the controller A200, the packet generation unit 310 generates a packet to be transmitted to the IC card 100 in relation to the file system A in the IC card 100. The communication unit 320 transmits the packet having been generated by the packet generation unit 310 to the controller A200.

The components shown in FIG. 1 may further include various other means not shown in the figure. For instance, the information processing system may include a means for generating and holding a key to be used when accessing the file system B in the IC card 100, a means for making a decision as to whether or not processing has ended normally by checking a packet received from the IC card 100, a means for controlling the entire controller B300 and the like.

Figure 2:
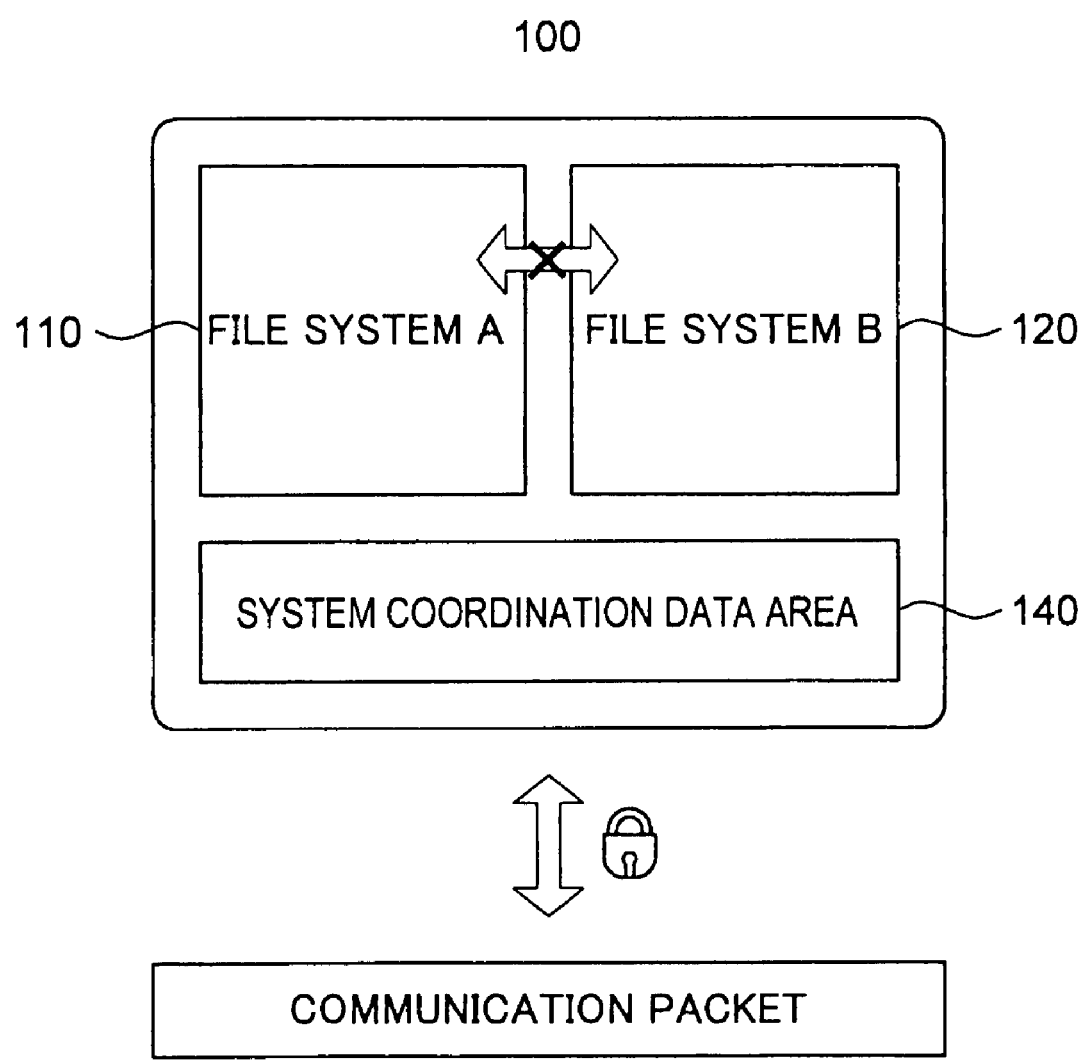
FIG. 2 shows an IC card.

(2) Structure of the IC Card 100 (FIG. 2)

FIG. 2 illustrates the structure of the data stored in the IC card 100. As shown in FIG. 2, file systems A110 and B120 and a system coordination data area 140 are included in the memory of the IC card 100. It is to be noted that while any number of file systems, including a single file system, may be present in the memory, an explanation is provided in reference to the embodiment on an example in which two file systems are stored. The file system A110 and the file system B120 each contain registered therein internal data and management data. Management data to be used to manage all the systems are contained in the system coordination data area 140.

The IC card 100 has a memory management function (a memory management unit 130 to be detailed later) for executing access control and an encrypted communication function (encryption processing units 118 and 128 to be detailed later). The memory management function executes memory access control in the IC card 100. The memory management function disallows memory access from any file system to another file system, but allows memory access from all the file systems to the system coordination data area. In addition, the encrypted communication function is engaged to execute memory access control for an external communication packet. The data within each file system are accessed by a key generated in advance in correspondence to the data.

Figure 3:
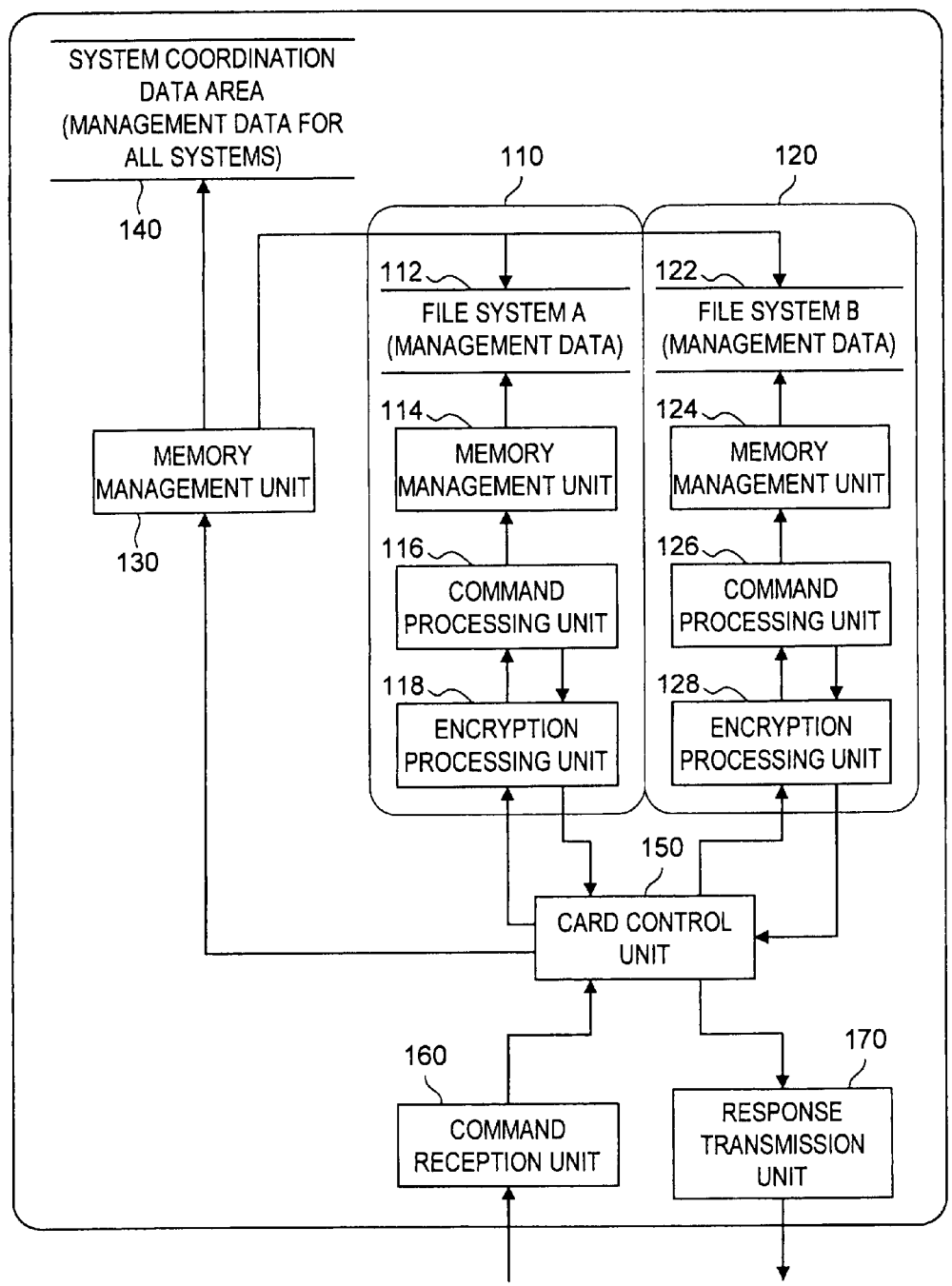
FIG. 3 illustrates a method adopted for IC card control.

(3) Functional Block Diagram (FIG. 3)

FIG. 3 is a diagram showing the functional structure of the IC card 100.

As shown in FIG. 3, the IC card 100 contains the file system A110, the file system B120, the memory management unit 130, the system coordination data area 140, a card control unit 150, a command reception unit 160 and a response transmission unit 170. The file system A110, the file system B120 and the system coordination data area 140 correspond to those in FIG. 2

The file system A110 includes management data 112 for the file system A and functional units of the file system A, i.e., the memory management unit 114, a command processing unit 116 and an encryption processing unit 118. In addition, the file system B120 includes management data 122 for the file system B and functional units of the file system B, i.e., a memory management unit 124, a command processing unit 126 and an encryption processing unit 128.

The encryption processing units 118 and 128 execute memory access control for external communication packets from the outside. The data in the file system A110 or the file system B120 is accessed by a key generated in advance in correspondence to the data. Following the data access, the corresponding encryption processing unit 118 or 128 executes encryption processing to encrypt a response packet, and the results of the encryption processing are transferred to the card control unit 150. The card control unit 150 checks the results and updates the management data for all the systems stored in the system coordination data area 140 (memory access commit processing). Subsequently, individual response packets are linked, and the linked response packets are transmitted via the response transmission unit 170.

The card control unit 150 controls the data in the file system A110 and the file system B120 based upon the system coordination data 140. The card control unit 150 separates the single command packet generated by linking a plurality of command packets intended for the file system A110 and the file system B120, hands over the separated command packets to the corresponding file system A110 and the file system B120 and also generates a single response packet by linking a plurality of response packets from the file system A110 and the file system B120. The sequence of this processing is to be described in more specific detail later with reference to FIGS. 12 and 13.

The memory management unit 130 executes memory access control in the IC card 100. The memory management unit 130 disallows memory access from the file system A110 to the file system B120 and memory access from the file system B120 to the file system A110, but allows memory access from the file system A110 and the file system B120 to the system coordination data area 140.

Upon receiving a command packet, the command reception unit 160 transfers the received command packet to the card control unit 150. The card control unit 150 separates the command packet, into the individual command packets, determines the beginnings of the separated packets and transfers the individual packets to the encryption processing units 118 and 128 in the corresponding system. The encryption processing units each execute decryption processing to decrypt the command packet and then the encryption processing units hand over the decryption processing results to the respective command processing units 116 and 126. The command processing units 116 and 126 respectively access the data and the management data 112 or 122 within the systems via the corresponding memory management units 114 and 124 (memory access processing) and set response data in response packets.

Figure 4:
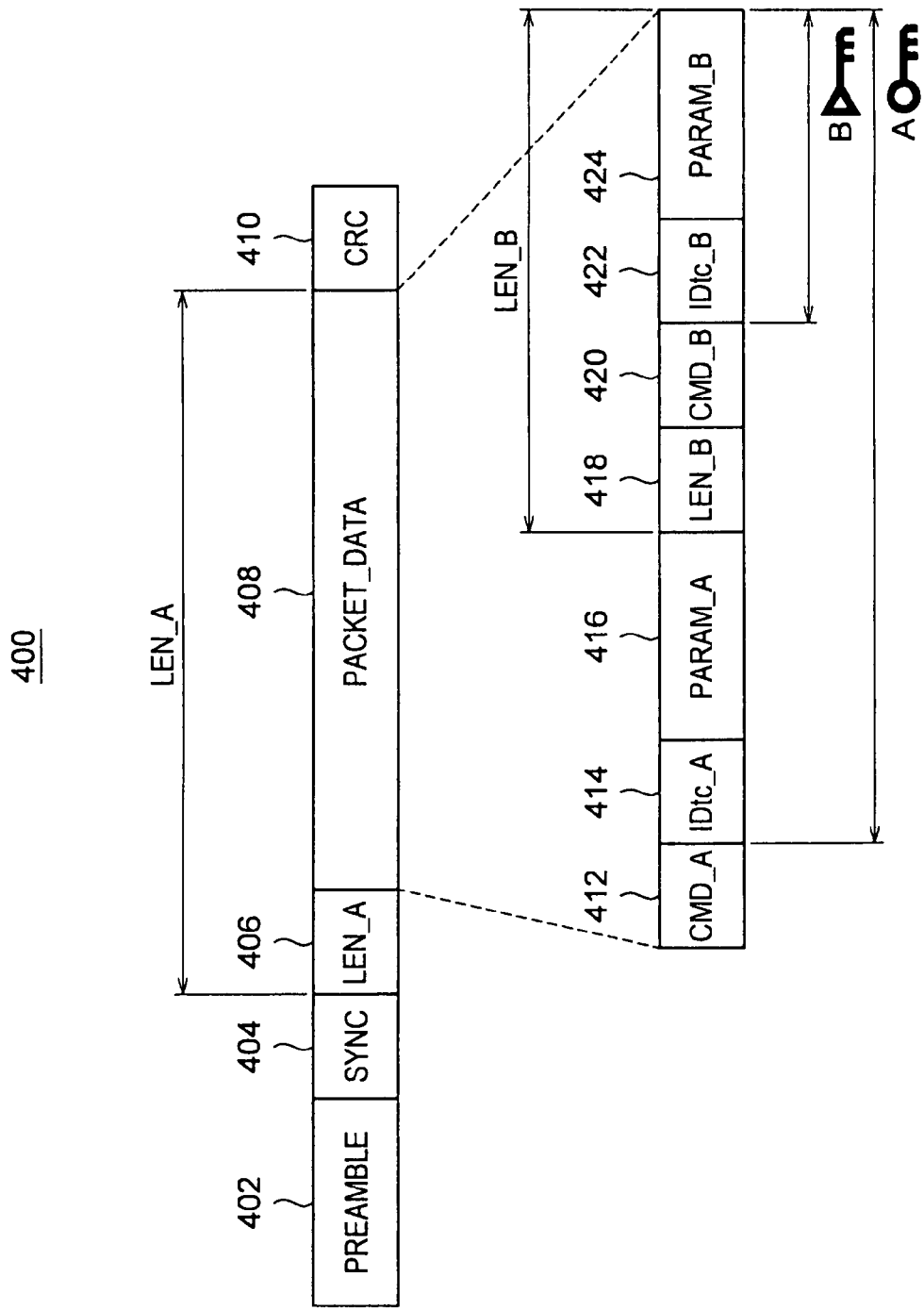
FIG. 4 illustrates a command packet.

(4) Packet Structure (FIG. 4)

FIG. 4 shows a command packet constituted of a plurality of command packets linked therein. The command packet in FIG. 4 is generated by the packet linking unit 220 in the controller A200 shown in FIG. 1. The packet linking unit 220 generates a single command packet by linking a packet generated by the packet generation unit 310 in the controller B300 into a command packet generated by the packet generation unit 210 in the controller A200. This command packet is a command for accessing the system memory in the IC card 100 (hereafter to be referred to as a memory access command).

As shown in FIG. 4, the memory access command contains two commands for accessing the system memory in the IC card 100. In the following description, the command for accessing the system memory (file system B) that is first mutually authenticated is to be referred to as a second command and the command for accessing the system memory (file system A) that is mutually authenticated next is to be referred to as a first command. The second command is embedded in the first command as a parameter. The second command is encrypted by using an access key B, whereas the first command is encrypted by using an access key A. FIG. 5 lists the names of the individual fields in the command packet 400 shown in FIG. 4, together with descriptions of each field.

As shown in FIG. 4, the command packet 400 contains a PREAMBLE field 402 in which a packet preamble is indicated, a SYNC field 404 in which synchronization data are provided, a LEN_A field 406 in which the length of the entire packet (PACKET_DATA) is indicated, a PACKET_DATA field 408 in which the packet data are provided and a CRC field 410 in which a check code used for communication error detection is indicated.

The PACKET_DATA field 408 includes fields 412-416 for the file system A and fields 418-424 for the file system B.

The fields for the file system A include a CMD_A field 412 in which a command (WritePlus/ReadPlus) for the file system A is indicated, an IDtc_A field 414 in which a byte string used for file system A identification is indicated and a PARAM_A field 416 in which the target data address in the file system A and the data to be written are indicated in correspondence to commands, and the command processing results and the data having been read out are indicated in correspondence to responses.

The fields for the file system B include a LEN_B field 418 in which the length of the packet for the file system B is indicated, a CMD_B field 420 in which a command (Write/Read) for the file system B is indicated, an IDtc_B field 422 in which a byte string used for file system B identification is indicated and a PARAM_B field 424 in which the target data address in the file system B and the data to be written are indicated in correspondence to commands, and the command processing results and the data having been read out are indicated in correspondence to responses.

It is to be noted that while the plurality of file systems adopt structures identical to one another in the example presented in FIG. 4, the present invention is not limited to this example. For instance, different common key encryption methods may be used together. In such a case, block encryption that uses a 64-bit key may be adopted in one of the file systems and block encryption that uses a 128-bit key may be adopted in the other file system. By using encryption algorithms with the varying key lengths, services at different security levels can be offered together. The same principle applies in the subsequent drawings as well.

The memory access command described above disallows access by a third party who does not own the systems in the IC card 100 to any of the system internal memories. For instance, it is difficult for the third party to replace the memory command for accessing the file system A alone with another command when the packet is output from the controller A200.

Next, the commands and the responses are explained in further detail by referring to specific examples.

Figure 6:
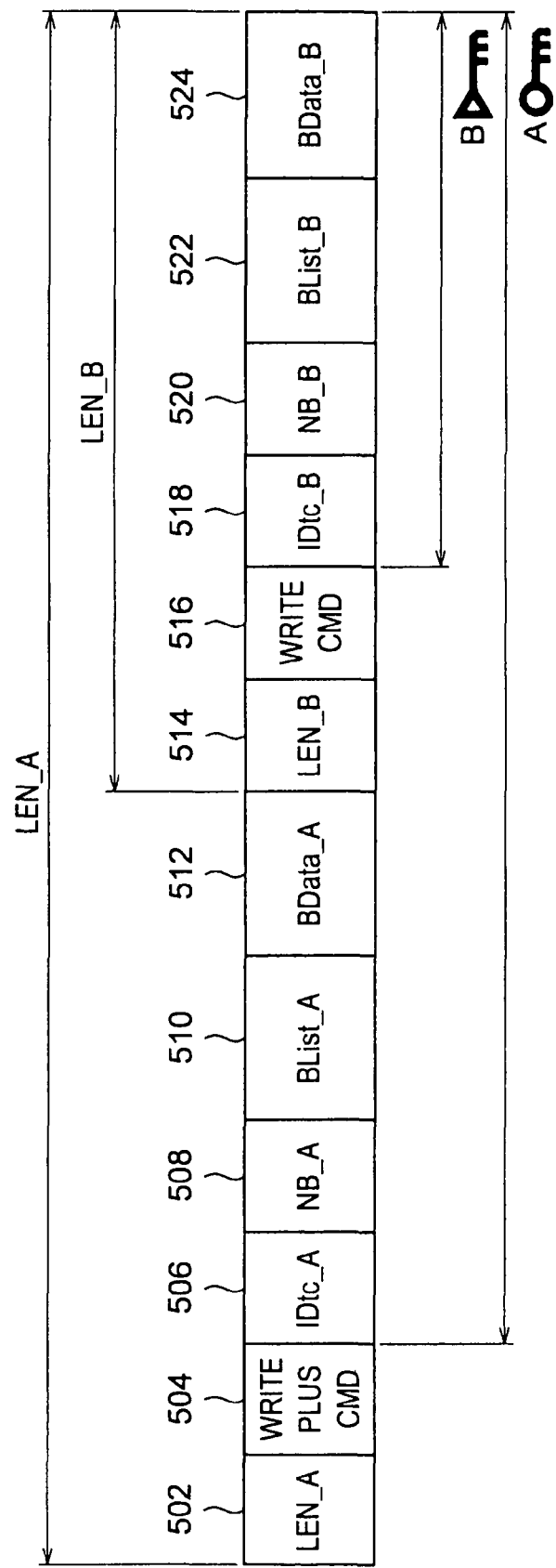
FIG. 6 presents an example of the write command packet.
Figures 7, 8:
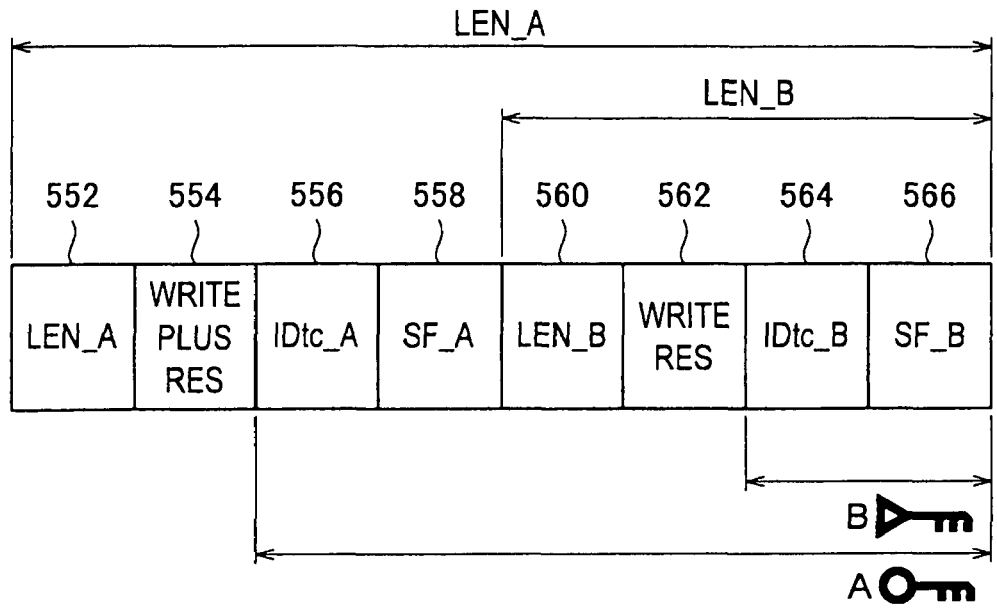
FIG. 7 presents an example of the write response packet.
FIG. 8 presents a table describing the packet elements.

(5) Write Command and Write Response (FIGS. 6-8)

FIG. 6 shows a write command packet, whereas FIG. 7 shows a write response packet. FIG. 8 lists the names of the individual fields in the write command packet in FIG. 6 and the write response packet in FIG. 7 together with descriptions of the respective fields.

As shown in FIG. 6, the write command 500 contains fields for the file system A, i.e., a LEN_A field 502 in which the length of the entire packet is indicated, a WRITE_PLUS_CMD field 504 in which the write command for the file system A is indicated, an IDtc_A field 506 in which a byte string used for a file system A identification is indicated, a NB_A field 508 in which the number of sets of data to be written in the file system A is indicated, a BList_A field 510 in which the address at which each set of data to be written in the file system A is indicated and a BData_A field 512 in which the data is to be written in the file system A are provided.

The write command 500 also contains fields for the file system B, i.e., a LEN_B field 514 in which the length of the packet for the file system B is indicated, a WRITE_CMD field 516 in which the write command for the file system B is indicated, an IDtc_B field 518 in which a byte string used for file system B identification is indicated, a NB_B field 520 in which the number of sets of data to be written in the file system B is indicated, a BList_B field 522 in which the address at which each set of data to be written in the file system B is indicated and a BData_B field 524 in which the data is to be written in the file system B are provided.

As described above, in the write command 500 in the embodiment, the command for the file system B is embedded in the command for the file system A as a parameter.

As shown in FIG. 7, the write response 550 contains fields for the file system A, i.e., a LEN_A field 552 in which the length of the packet corresponding to the file system A is indicated, a WRITE_PLUS_RES field 554 in which the write response at the file system A is indicated, an IDtc_A field 556 in which a byte string used for a file system A identification is indicated, and a SF_A field 558 in which the write processing results achieved in the file system A are indicated.

The write response 550 also contains fields for the file system B, i.e., a LEN_B field 560 in which the length of the packet corresponding to the file system B is indicated, a WRITE_RES field 562 in which the write response at the file system B is indicated, an IDtc_B field 564 in which a byte string used for a file system B identification is indicated, and a SF_B 566 field in which the write processing results achieved in the file system B are indicated.

As described above, in the write response 550 in the embodiment, the response at the file system B is embedded as a parameter in the response at the file system A.

Figure 9:
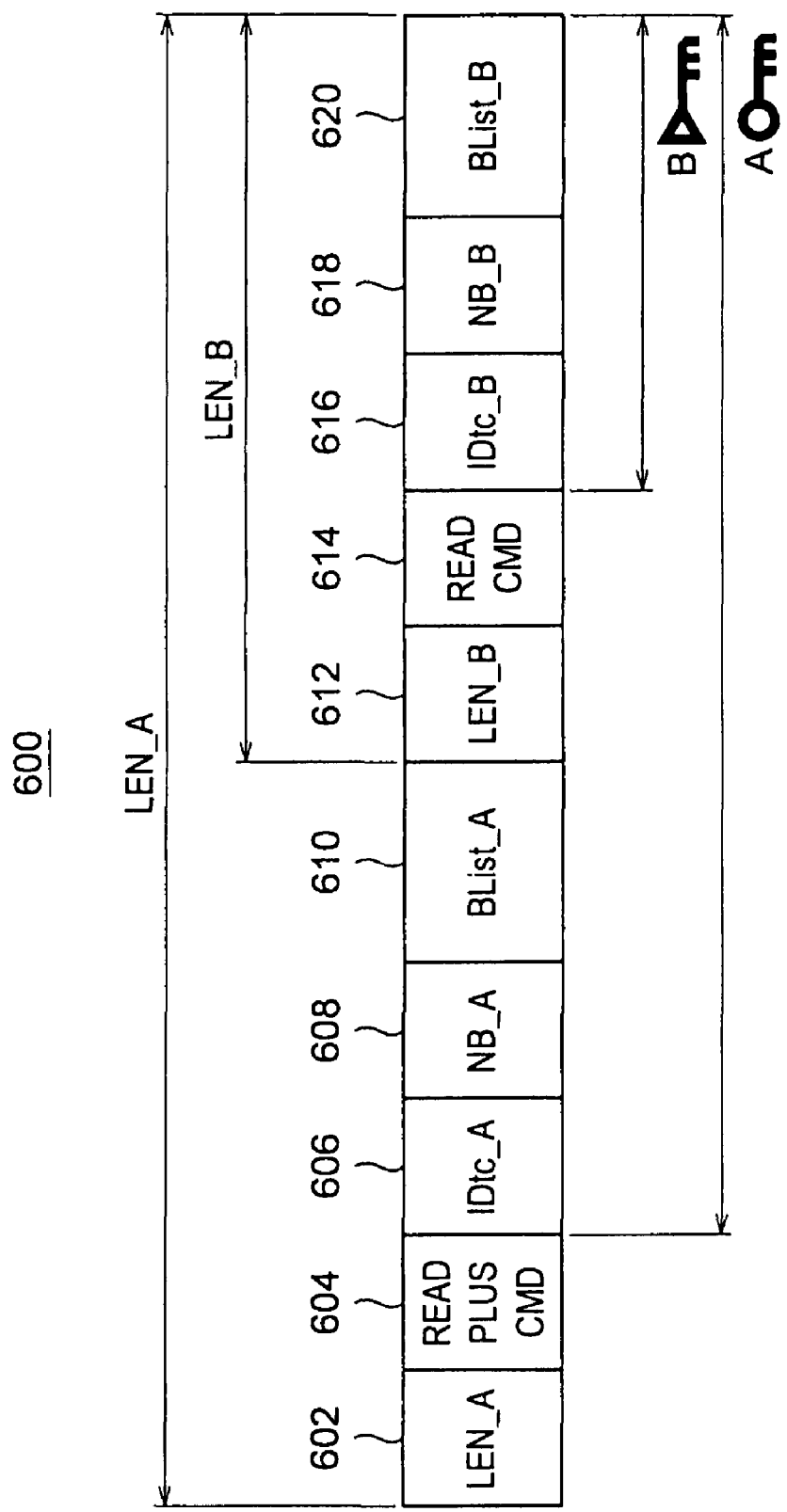
FIG. 9 presents an example of the read command packet.
Figure 10:
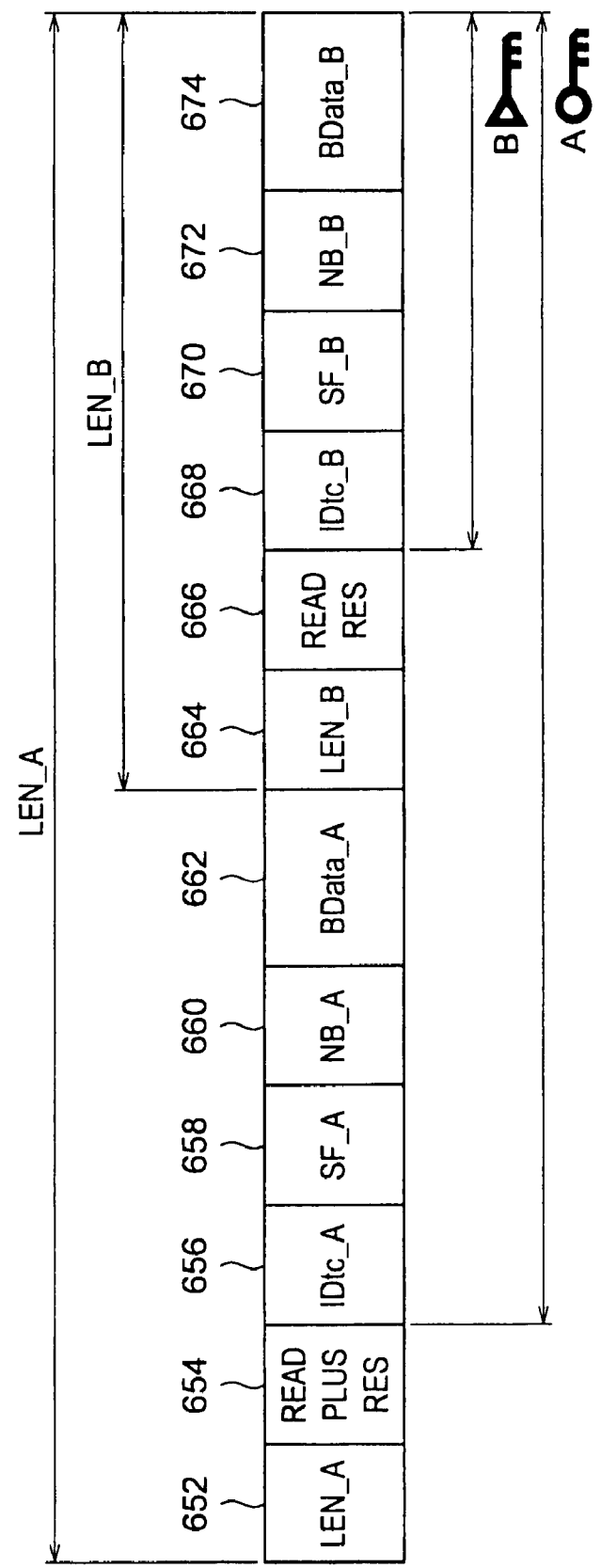
FIG. 10 presents an example of the read response packet.

(6) Read Command and Read Response (FIGS. 9~11)

FIG. 9 shows a read command packet, whereas FIG. 10 shows a read response packet. FIG. 11 lists the names of the individual fields in the read command packet in FIG. 9 and the read response packet in FIG. 10 together with descriptions of the respective fields.

As shown in FIG. 9, the read command 600 contains fields for the file system A, i.e., a LEN_A field 602 in which the length of the entire packet is indicated, a READ_PLUS_CMD field 604 in which the read command for the file system A is indicated, an IDtc_A field 606 in which a byte string used for file system A identification is indicated, a NB_A field 608 in which the number of sets of data to be read out from the file system B is indicated, and a BList_A field 610 in which the address at which each set of data is to be read out in the file system A is indicated.

The read command 600 also contains fields for the file system B, i.e., a LEN_B field 612 in which the length of the packet for the file system B is indicated, a READ_CMD field 614 in which the read command for the file system B is indicated, an IDtc_B field 616 in which a byte string used for file system B identification is indicated, a NB_B field 618 in which the number of sets of data to be read out from the file system B is indicated, and a BList_B field 620 in which the addresses from which each set of data to be read out in the file system B is indicated.

As described above, in the read command 600 in the embodiment, the command for the file system B is embedded in the command for the file system A as a parameter.

As shown in FIG. 10, the read response 650 contains fields for the file system A, i.e., a LEN_A field 652 in which the length of the entire packet corresponding to the file system A is indicated, a READ_PLUS_RES field 654 in which the read response at the file system A is indicated, an IDtc_A field 656 in which a byte string used for a file system A identification is indicated, a SF_A field 658 in which the read processing results achieved in the file system A are indicated, a NB_A field 660 in which the number of sets of data read out from the file system A is indicated and a BData_A field 662 in which the data read out from the file system A are provided.

The read response 650 also contains fields for the file system B, i.e., a LEN_B field 664 in which the length of the packet corresponding to the file system B is indicated, a READ_RES field 666 in which the read response at the file system B is indicated, an IDtc_B field 668 in which a byte string used for a file system B identification is indicated, a SF_B 670 field in which the read processing results achieved in the file system B are indicated, a NB_B field 672 in which the number of sets of data read out from the file system B is indicated, and a BData_B field 674 in which the data read out from the file system B are provided.

As described above, in the read response 650 in the embodiment, the response at the file system B is embedded as a parameter in the response at the file system A.

Next, the operation executed in the embodiment adopting the structure described above is explained.

Figure 12:
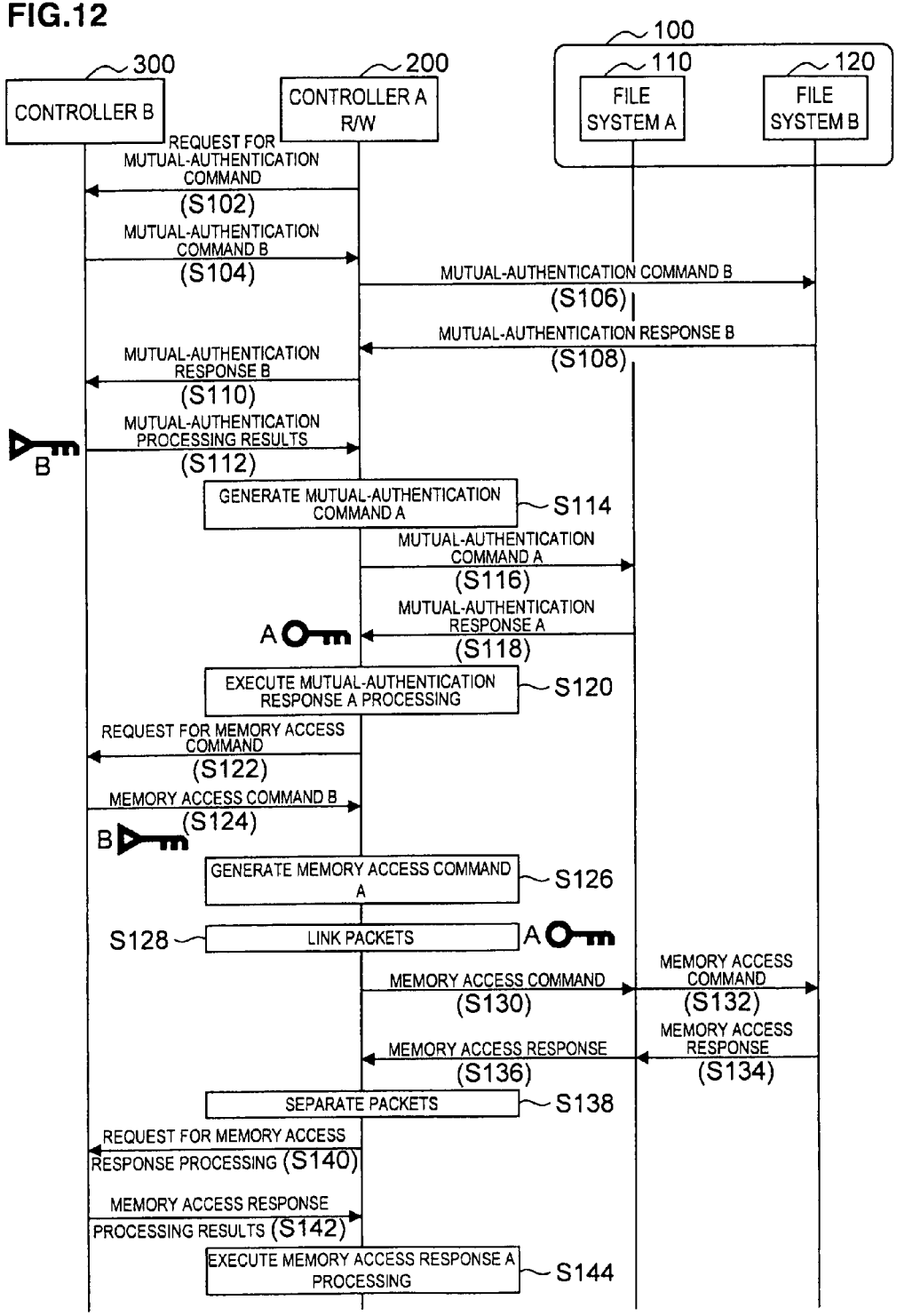
FIG. 12 presents a table describing the sequence of the IC card control.

(7) Processing Sequence (FIG. 12)

Simultaneous access to both the file system A and the file system B in the IC card is now considered. Keys generated in advance in correspondence to the specific systems may be needed to access the individual system areas. The keys are generated through mutual authentication executed between the controllers and the corresponding systems within the IC card. The plurality of system memories in the IC card is simultaneously accessed via the two controllers by executing in sequence mutual authentication B, mutual authentication A, memory access A and memory access B on the IC card.

FIG. 12 shows the sequence of the processing executed in the embodiment.

First, the controller A200 issues a request to the controller B300 for a mutual authentication command for the file system B120 (step S102). In response, the controller B300 transmits a mutual authentication command B to the controller A200 (step S104). The controller A200 then transfers the mutual authentication command B to the IC card 100 via the Reader/Writer (step S106). The IC card 100 executes mutual authentication processing in the file system B120 and returns the results as a mutual authentication response B (step S108). The controller A200 passes the mutual authentication response B onto the controller B300 (step S110). The controller B300 executes authentication processing to determine whether or not the mutual authentication processing has ended normally and sends the mutual authentication results to the controller A200 (step S112). If the mutual authentication is determined to have ended normally, the operation proceeds to the next processing. At this time, the controller B300 generates an access key B to be used to access the file system B120.

Next, mutual authentication processing is executed for the file system A (steps S114-S120). The controller A200 generates a mutual authentication command for the file system A110 (step S114) and transmits the mutual authentication command A by communicating with the IC card 100 via the Reader/Writer (step S116). The IC card 100 executes mutual authentication processing in the file system A110 and returns the results as a mutual authentication response A (step S118). The controller A200 processes the mutual authentication response A to determine whether or not the mutual authentication has ended normally (step S120). If the mutual authentication is determined to have ended normally, the operation proceeds to the next processing. At this time, the controller A200 generates an access key A to be used to access the file system A110.

The access keys A and B generated through the mutual authentication as described above do not allow any data leak to a third party from a packet undergoing mutual authentication.

Subsequently, the controller A200 issues a request to the controller B300 for a memory access command for the file system B120 (step S122). The controller B300 sends back a memory access command B to the controller A200 (step S124). The command B will have been encrypted by using the access key B. The controller A200 generates a memory access command A for the file system A110 (step S126). The controller A200 links the memory access command B to the memory access command A as a parameter and encrypts the memory access command A with the access command B linked therein by using the access key A (step S128). The controller A then transmits a memory access command made up with the linked memory access commands to the IC card 100 (step S130).

Upon receiving the memory access command A, the IC card 100 decrypts it by using the access key A and accesses the memory of the file system A110 (step S130). Then, the memory access command B contained in the memory access command A is decrypted with the access key B and the memory of the file system B120 is accessed (step S132). As in the case of commands, the processing results, i.e., the response at the file system B120, are encrypted with the access key B (step S134), and the response at the file system A110, including the encryption results, is encrypted with the access key A. The IC card 100 sends back a memory access response made up with the linked memory access responses to the controller A200 (step S136).

Upon receiving the memory access response, the controller A200 decrypts the received memory access response with the access key A (step S138) and verifies the results of the processing executed for the file system A110. Then, the controller A200 hands over the processing results with regard to the file system B120, which are included in the memory access responses, to the controller B300 and requests memory access response processing (step S140). The controller B300 decrypts the packet with the access key B, verifies the processing results and hands over the memory access response processing results to the controller A200 as a memory access response A (step S142). The controller A200 makes a decision as to whether or not the memory access processing has ended normally by processing the memory access response A (step S120).

Figure 13:
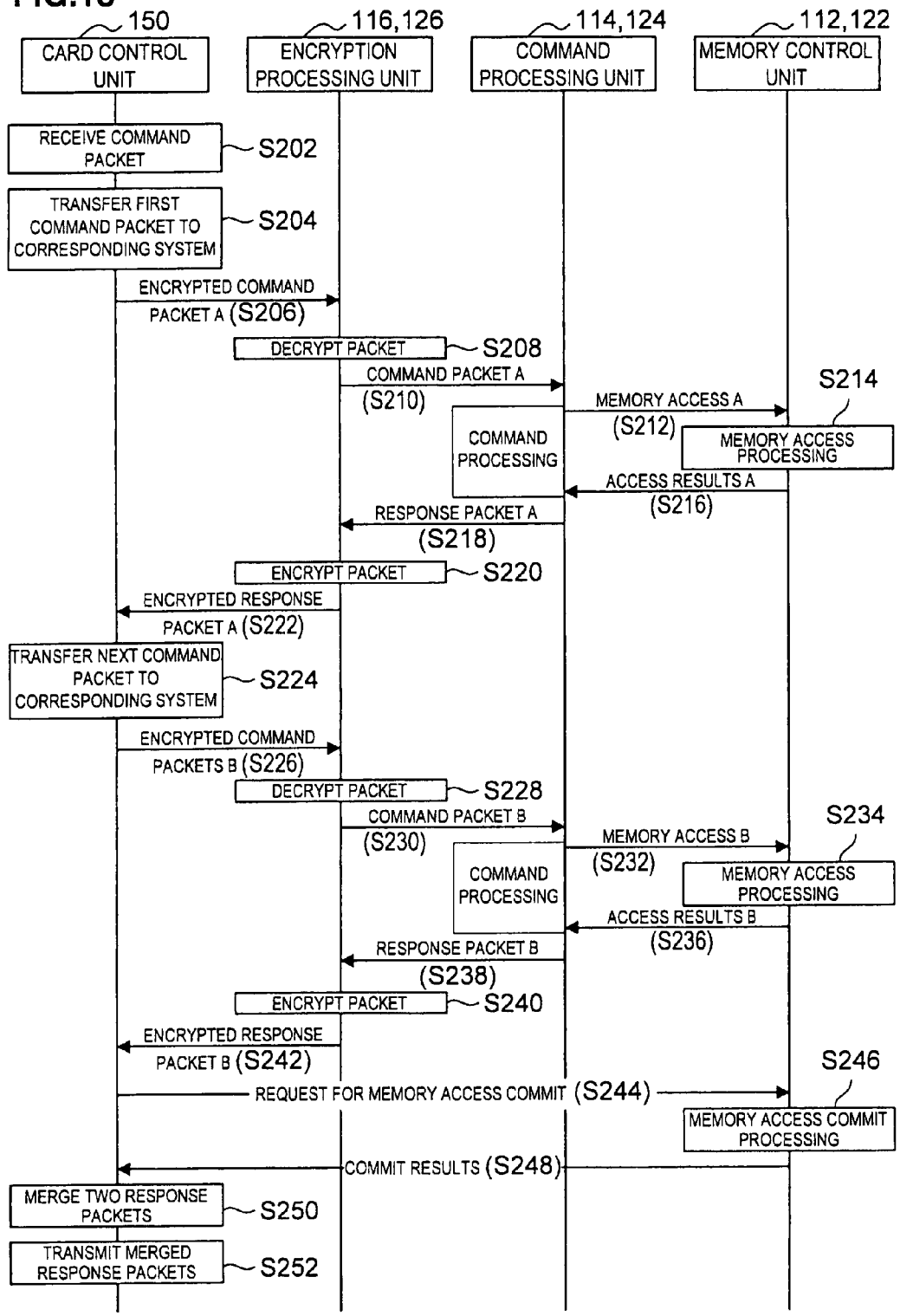
FIG. 13 presents a chart of the sequence of the memory access command processing.

(8) Sequence of Memory Access Command Processing (FIG. 13)

FIG. 13 shows the sequence of the memory access command processing.

The processing executed in the memory management unit 130 in response to the memory access command is divided into memory access processing and memory access commit processing executed within the individual systems.

(Memory Read)

The internal data are extracted from the management data in the system through the memory access processing, without executing any operation in the commit processing.

(Memory Write)

The management data and the internal data within the individual systems are updated through the memory access processing and the management data for all the systems that are updated through the commit processing. An explanation is now given in reference to FIG. 13.

Upon receiving a command packet (step S202), the card control unit 150 hands over the packet to the system corresponding to the first command packet (step S204). An explanation is given in reference to the embodiment by assuming that the packet is first handed over to the file system A and then to the file system B.

The encrypted command packet A is transmitted from the card control unit 150 to the encryption processing unit 118 (step S206). The encryption processing unit 118 decrypts the packet (step S208) and hands over the command packet A to the command processing unit 116 (step S210). The command processing unit 116 executes the following command processing. The command processing unit 116 first issues a memory access request to the memory management unit 114 (step S212). The memory management unit 114 executes memory access processing (step S214) and sends back access results A to the command processing unit 116 (step S216). The command processing unit 116, in turn, transmits a response packet A to the encryption processing unit 118 (step S218). The encryption processing unit 118 encrypts the packet (step S220) and transmits the encrypted response packet A to the card control unit 150 (step S222).

The next command packet then is handed over to the corresponding system (file system B) (step S224), and similar processing is executed for the file system B as well (step S226~S242). Namely, the encrypted command packet B is transmitted from the card control unit 150 to the encryption processing unit 128 (step S226). The encryption processing unit 128 decrypts the packet (step S228) and hands over the command packet B to the command processing unit 126 (step S230). The command processing unit 126 executes the following command processing. The command processing unit 126 first issues a memory access request to the memory management unit 124 (step S232). The memory management unit 124 executes memory access processing (step S234) and sends back access results B to the command processing unit 126 (step S236). The command processing unit 126, in turn, transmits a response packet B to the encryption processing unit 128 (step S238). The encryption processing unit 128 encrypts the packet (step S240) and transmits the encrypted response packet B to the card control unit 150 (step S242).

After the encrypted response packets A and B are transmitted, the card control unit 150 issues a memory access commit request to the memory management units 114 and 124 (step S244). The memory management units 114 and 124 execute memory access commit processing (step S246) and send back the commit results to the card control unit 150 (step S248).

Upon receiving the commit result, the card control unit 150 merges the two response packets A and B (step S250) and transmits a single response packet (step S252).

Figure 14:
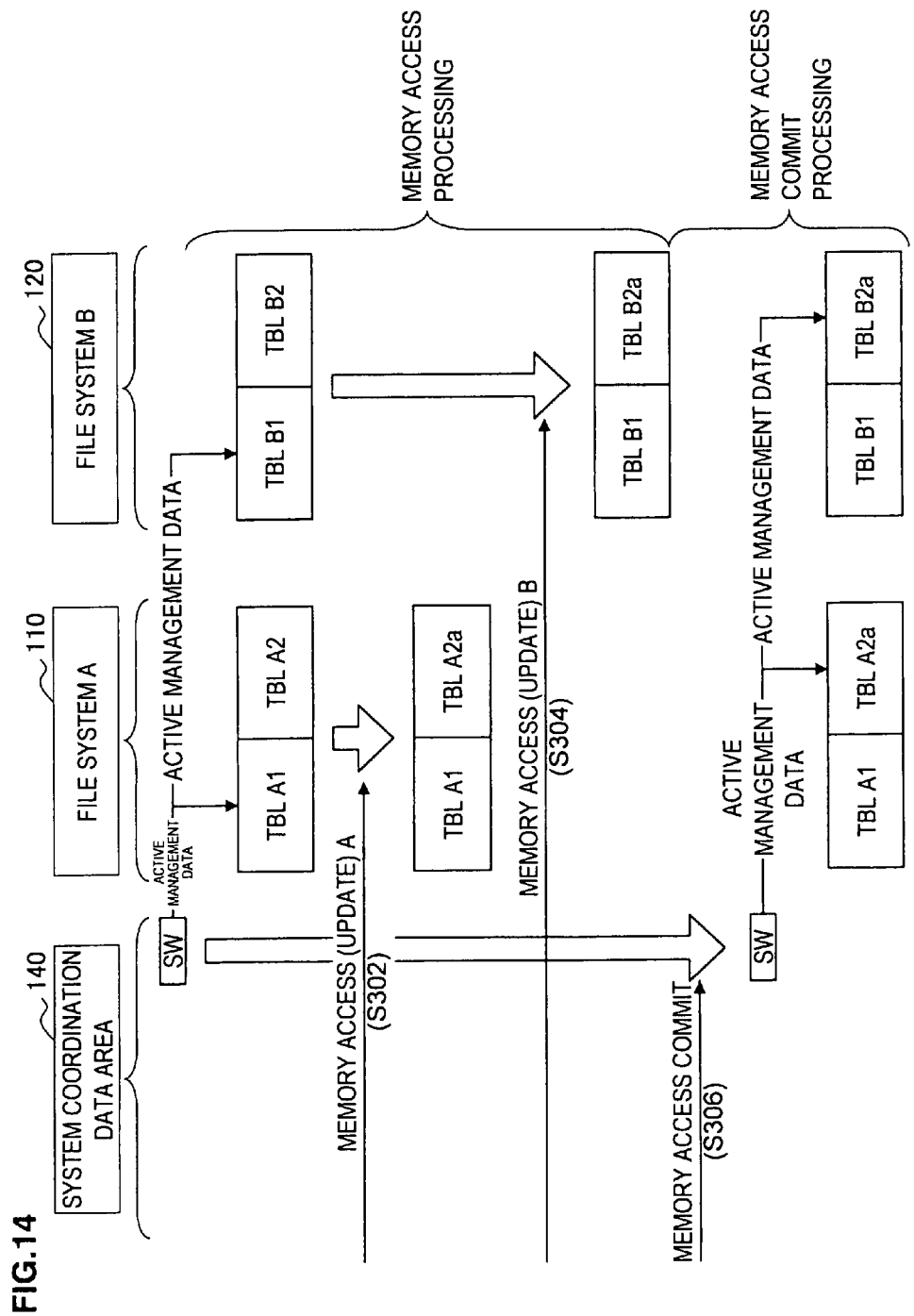
FIG. 14 presents a chart of the memory access processing and the memory access commit processing.

(9) Memory Management Unit (FIG. 14)

FIG. 14 shows the memory access processing and the memory access commit processing.

The memory management unit 130 holds the management data in duplicate in a nonvolatile memory in order to protect the management data in the event of a power-out. Such management data are referred to as active management data and backup management data. TBL_A1 and TBL_A2 are held in the file system A110, TBL_B1 and TBL_B2 are held in the file system B120, and the active management data are indicated with management data SW in the system coordination data area 140.

In the memory access processing executed during a memory write, the backup management data in each system are updated (steps S302 and S304). Since the backup management data are updated, the data visible from the outside remain unchanged in the event of a power-down. In the subsequent memory access commit processing, the management data SW pointing to the active management data in all the systems are updated (step S306). It is assumed that following the processing described above, the management table for all the systems has been updated.

Figure 15:
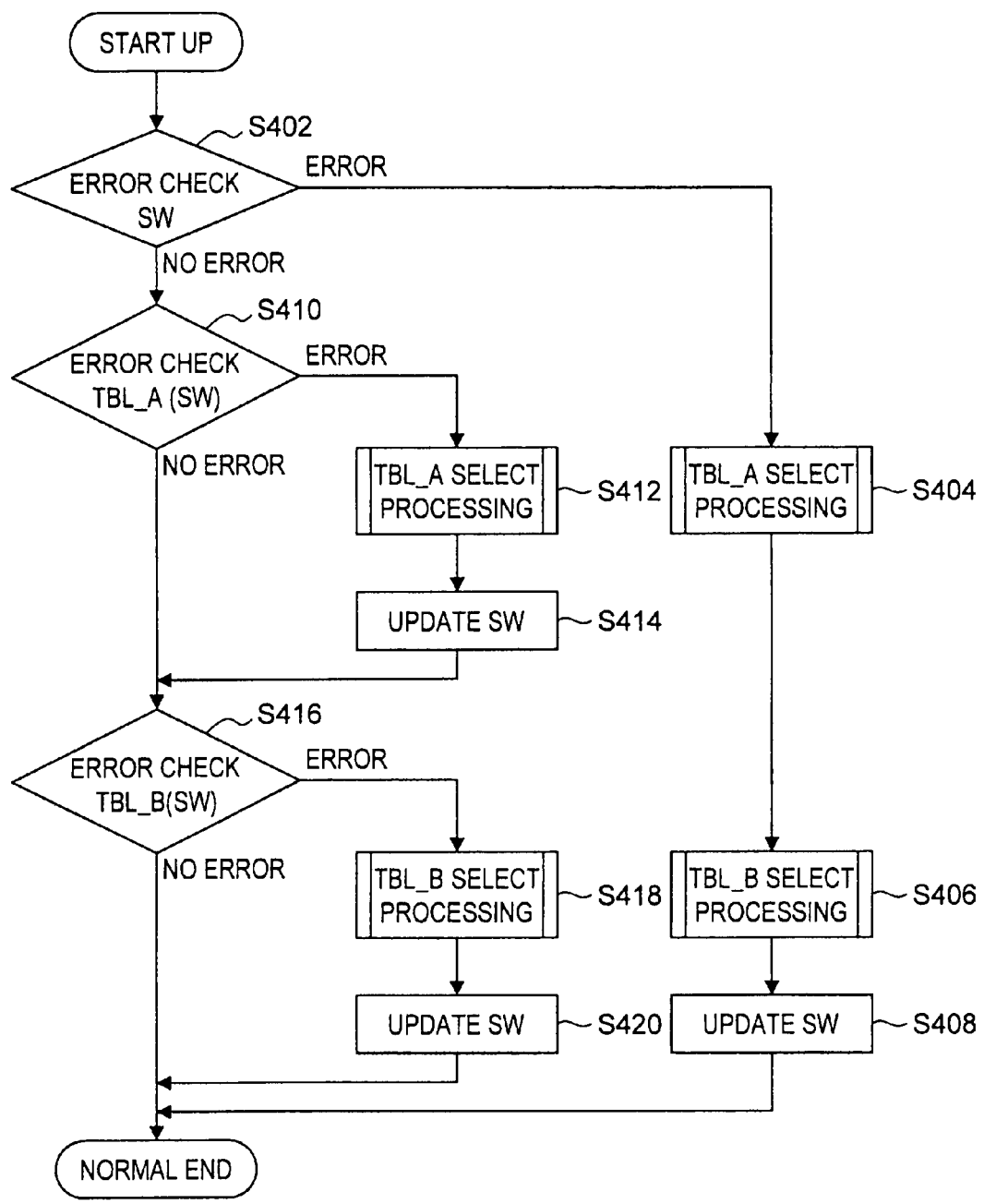
FIG. 15 presents a chart of the recovery processing executed after a power-out.
Figure 16:
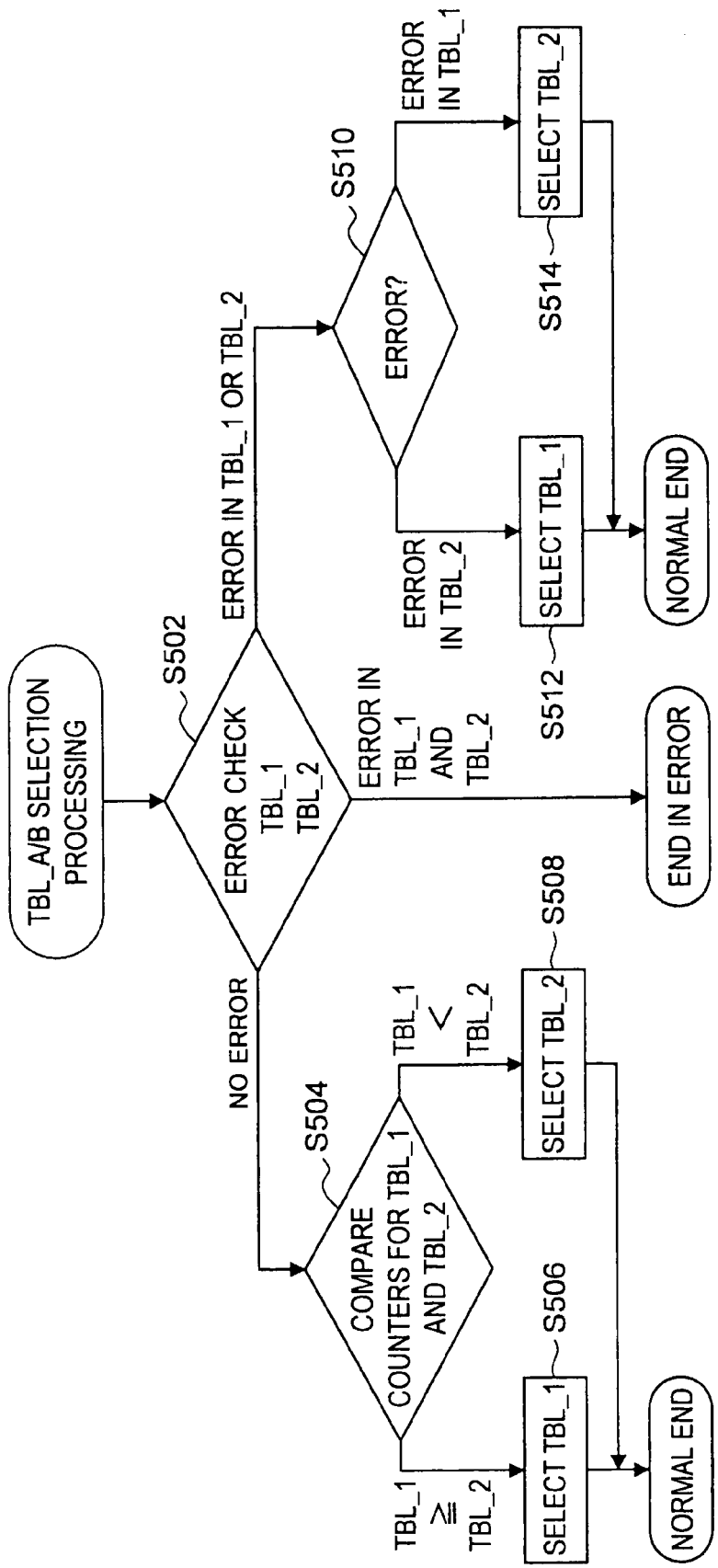
FIG. 16 presents a chart of the recovery processing executed after a power-out.

(10) Recovery Processing Following Power-Out (FIGS. 15 and 16)

FIGS. 15 and 16 show the recovery processing executed after a power-out.

The power-out recovery processing is part of initialization processing executed in the memory management unit 130 at startup.

Each set of management data among the active management data and the backup management data (TBL_A 1, TBL_A2, TBL_B1 and TBL_B2) in FIG. 14 includes a counter and a check block. The counter is incremented each time the corresponding management data are updated. The check block is used to detect an error in the management data and is recalculated each time the management data are updated. In addition, SW contains a check block used for error detection.

The memory management unit 130 is initialized by executing an error check in the order of SW, TBL_A and TBL_B and selecting the active management data for TBL_A and TBL_B. If an error has occurred, the active management data for TBL_A or TBL_B are selected based upon the details of the error having occurred in the TBL_A or TBL_B and the contents of the corresponding counter. If an error has occurred in both the active management data and the backup management data, the initialization ends in an error and a normal startup of the IC card is disallowed.

More specifically, an error check is first executed for SW (step S402) as shown in FIG. 15. If an error has occurred in SW, TBL_A select processing (step S404) and TBL_B select processing (step S406) are executed in sequence and SW is updated (step S408).

If no error is detected through the error check (step S402) executed for SW, an error check is executed for TBL_A (SW) (step S410). If an error has occurred in TBL_A (SW), TBL_A select processing is executed (step S412) and SW is updated (step S414).

If no error is detected through the error check (step S410) executed for TBL_A (SW), an error check is executed for TBL_B (SW) (step S416). If an error has occurred in TBL_B (SW), TBL_B select processing is executed (step S418) and SW is updated (step S420). On the other hand, if no error has occurred in TBL_B (SW), the processing ends normally.

If the TBL_A select processing or the TBL_B select processing has been executed in the processing shown in FIG. 15, SW is modified so as to reflect the selected active management data, and thus it is ensured that normal processing is enabled at the next startup.

More specifically, an error check is executed for TBL_1 and TBL_2 shown in FIG. 16 (step S502). Then, if an error is detected in both TBL_1 and TBL_2, the processing ends in an error.

On the other hand, if no error is detected either in TBL_1 or TBL_2 through the error check (step S502) executed on TBL_1 and TBL_2, the counter values corresponding to TBL_1 and TBL_2 are compared (step S504). If TBL_1≦TBL_2 is true, TBL_1 is selected (step S506), whereas TBL_2 is selected if TBL_1<TBL_2 is true (step S508).

If an error is detected either in TBL_1 or TBL_2 through the error check (step S502) executed for TBL_1 and TBL_2, a decision is made as to whether TBL_1 or TBL_2 contains the error (step S510). If an error has occurred in TBL_2, TBL_1 is selected (step S512), whereas TBL_2 is selected if an error has occurred in TBL_1 (step S514).

(Advantages of the First Embodiment)

For instance, a single command packet intended for a plurality of file systems may be received at an IC card, having registered therein a system corresponding to an electronic money service and another system corresponding to a ticket service from a customer wishing to purchase a ticket with electronic money. In such a case, the ticket price is subtracted from the electronic money account and the value of the ticket is written into the ticket service. In the related art, the processing is executed in separate processing sequences, and thus, if an error such as a power-out occurs during the transaction, the ticket may not be purchased successfully or the Reader/Writer or the host controller may need to execute complicated processing to judge whether or not the ticket has been purchased for use by the user. However, such an indeterminate condition does not occur in the embodiment.

In addition, by loading different services that have been started with separate file systems into a single IC card, a highly secure billing and payment service can be provided through coordination of the individual services.

In addition, it is difficult for a third party who does not own the systems within the card to access the system internal memories. As a result, an advantage is achieved in that it is difficult for the third party to switch the memory command for accessing the file system A alone with a false command when the memory command is output from the controller A200.

Figure 26:
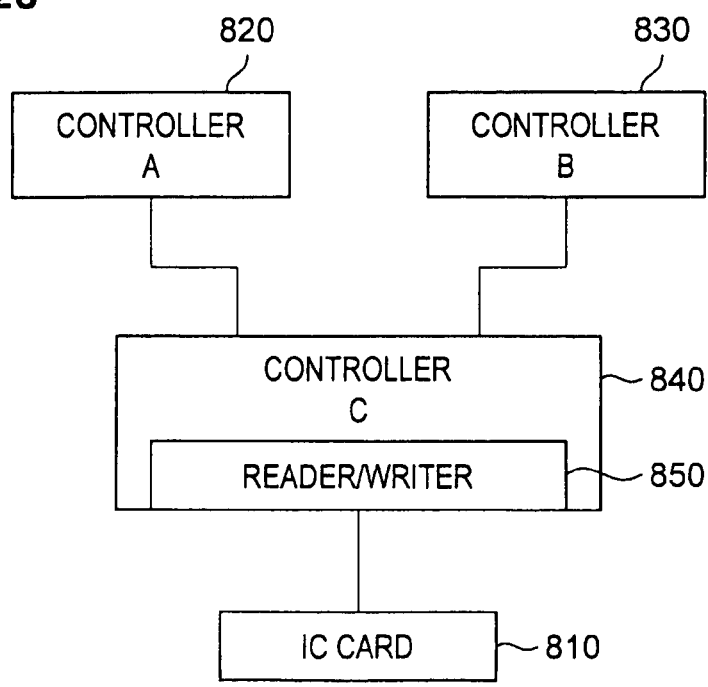
FIG. 26 illustrates an information processing system in the related art.

Unlike the structural example (see FIG. 26) of the related art, the image processing system can be configured in conjunction with two controllers instead of three controllers, achieving better cost performance.

An explanation is given above in reference to the first embodiment of an example in which two system areas are present within the card and higher-order controllers are engaged in operation each in correspondence to one of the systems. However, the present invention is not limited to this example, and it may be adopted equally effectively in a configuration with three or more system areas present within a card and higher-order controllers engaged in operation each in correspondence to one of the systems. Examples in which the configuration includes three system areas and three higher-order controllers are explained next. It is assumed that session information related to sessions carried out in three systems can be held simultaneously in the card in correspondence to the three system areas. The term "session information" refers to information that might be necessary for packet encryption, and each set of session information is constituted with an encryption key and a byte string used for system identification. It is to be noted that depending upon the specific method adopted to enable communication among the higher-order controllers, the higher-order controllers may adopt either a serial configuration or a parallel configuration. The serial configuration is explained in reference to the second embodiment and the parallel configuration is explained in reference to the third embodiment below.

Second Embodiment

Serial Configuration

In the serial configuration explained in reference to the embodiment, the three higher-order controllers engage in serial communication. The information processing system achieved in the embodiment includes an IC card 105, a controller A200 equipped with a Reader/Writer (R/W) 250, a controller B350 and a controller C360 as shown in FIG. 17.

Three system areas (to be referred to as file system A, file system B and file system C) are present in the IC card 105 in the embodiment. The IC card 105 is otherwise identical to the IC card explained in reference to the first embodiment. In addition, the controller A200 equipped with the Reader/Writer 250 is a controller corresponding to the file system A and is similar to the controller A200 (see FIG. 1) in the first embodiment.

Figure 17:
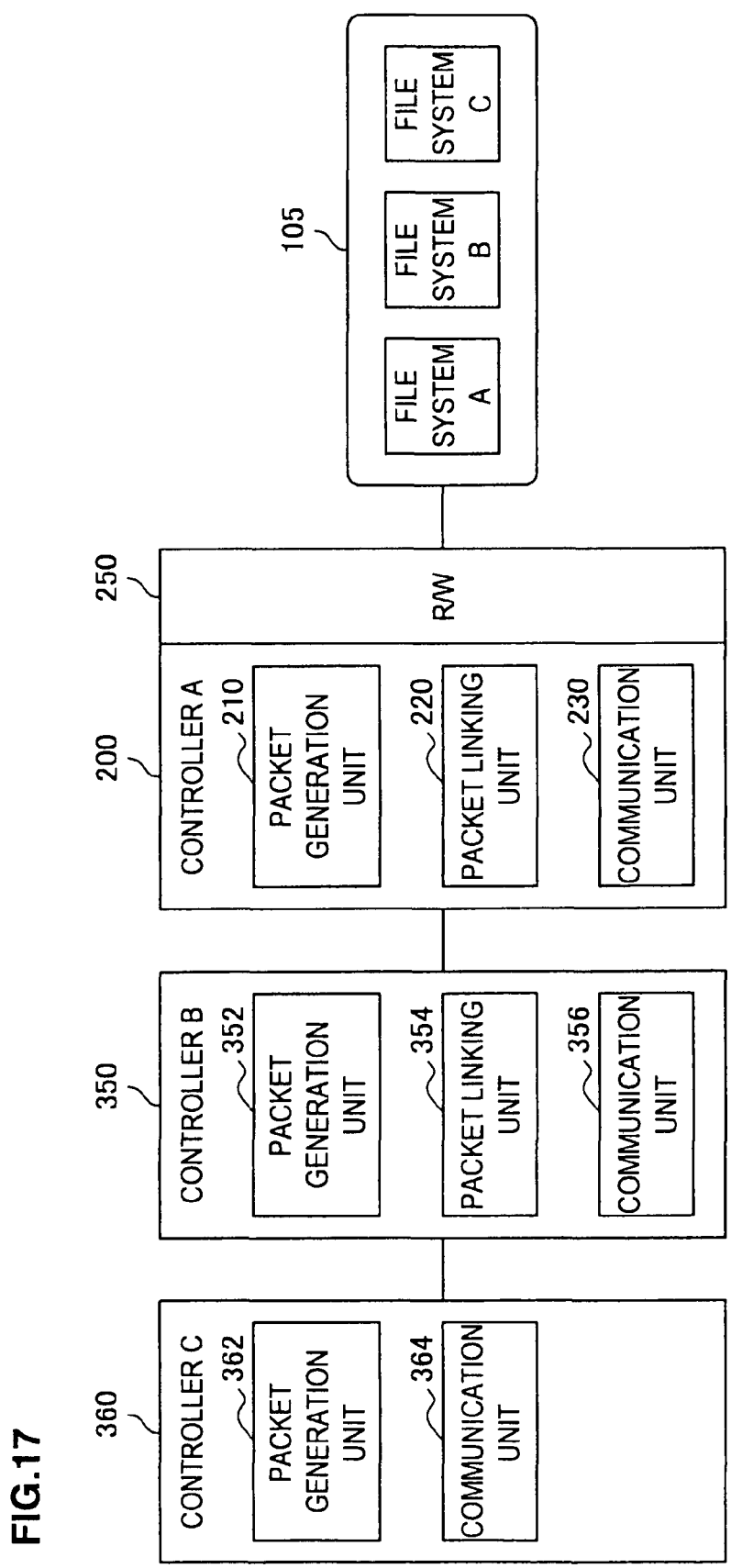
FIG. 17 illustrates the information processing system achieved in a second embodiment.

As shown in FIG. 17, the controller B350 includes a packet generation unit 352 that generates a command packet to be transmitted to the IC card 105 in relation to the file system B in the IC card 105, a command packet linking unit 354 that generates a single command packet by linking the command packet generated by the packet generation unit 352 and a command packet generated by the controller C360 and a communication unit 356 that engages in communication with the controller A200 and the controller C360.

As shown in FIG. 17, the controller C360 includes a packet generation unit 362 that generates a command packet to be transmitted to the IC card 105 in relation to the file system C in the IC card 105 and a communication unit 364 that engages in communication with the controller B350. The communication unit 364 transmits the packet generated by the packet generation unit 362 to the controller B350.

Figure 19:
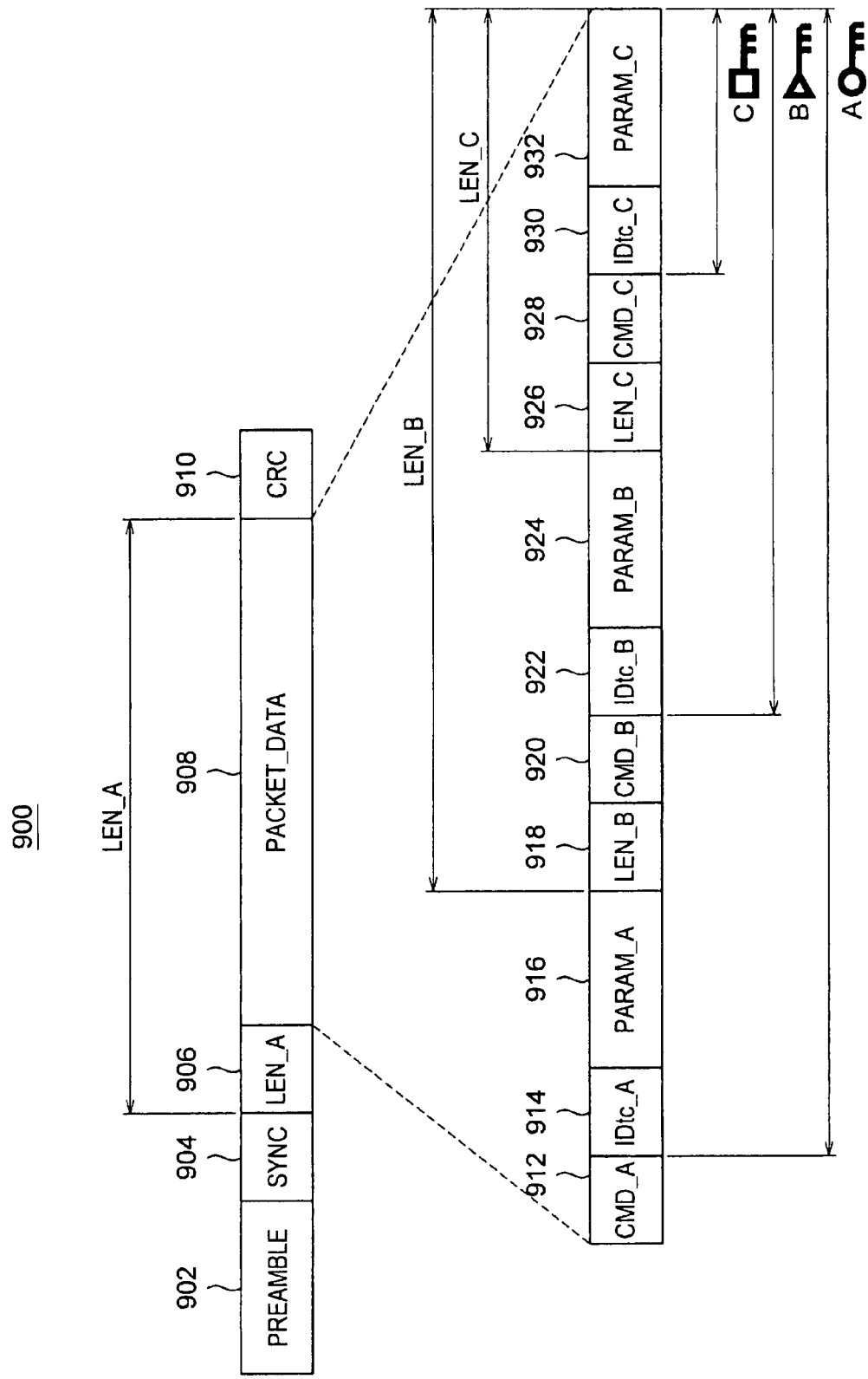
FIG. 19 illustrates a command packet.

FIG. 19 shows a command packet made up with a plurality of command packets linked therein. The command packet in FIG. 19 is generated by the packet linking unit 220 in the controller A200 shown in FIG. 17.

Figure 18:
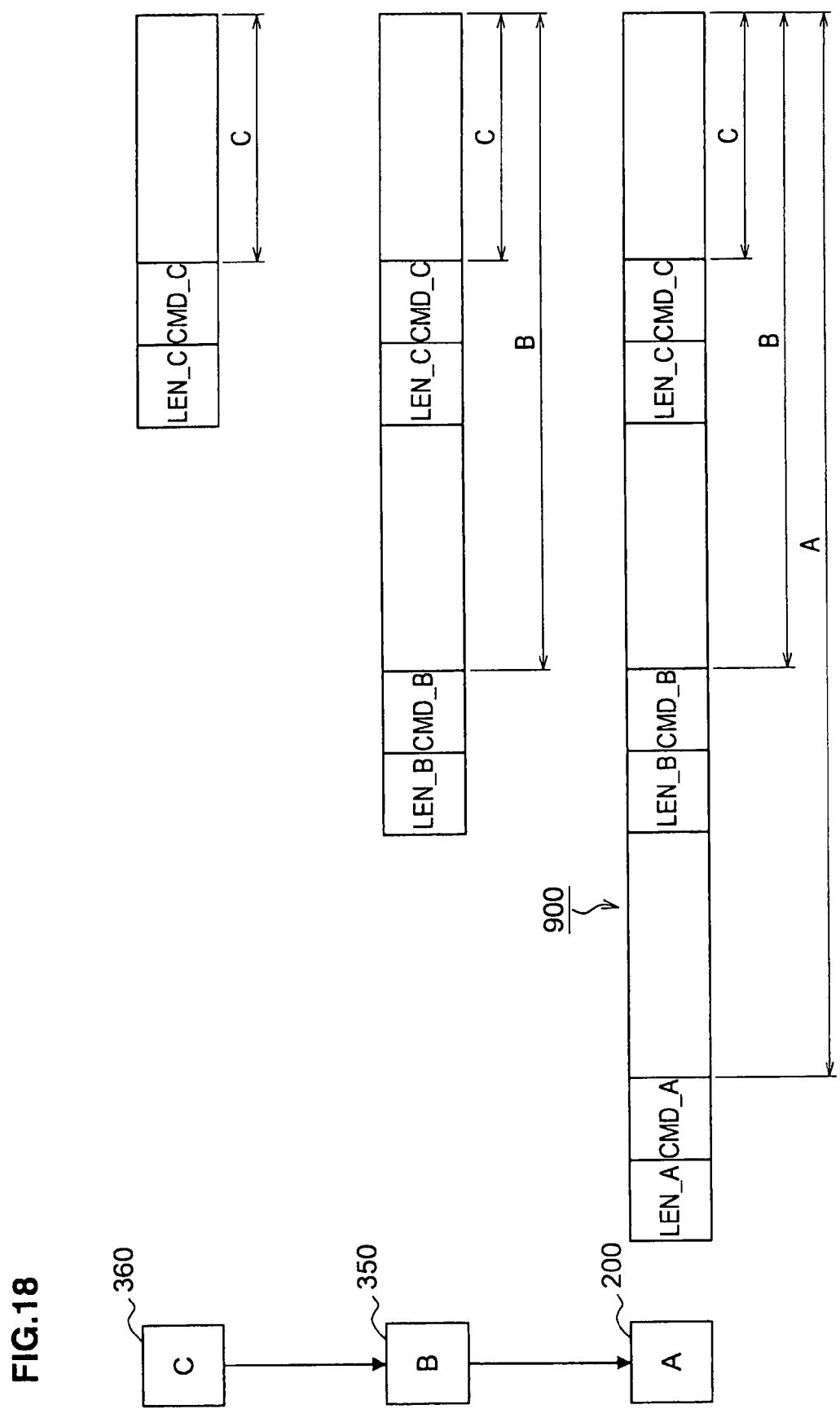
FIG. 18 illustrates alterations that occur in the packet structure.

FIG. 18 shows alterations that occur in the packet structure. As shown in FIG. 18, the packet linking unit 354 in the controller B350 links a packet generated by the packet generation unit 362 in the controller C360 into a command packet generated by the packet generation unit 352 and the controller B350, thereby generating a single command packet. The packet linking unit 220 in the controller A200, in turn, generates a single command packet by linking the packet output from the controller B350 into a command packet generated by the packet generation unit 210 in the controller A200. This command packet constitutes a command for accessing the system memories in the IC card 105 (hereafter referred to as a memory access command).

As shown in FIG. 19, the memory access command contains three commands for accessing the system memory in the IC card 105. In the following description, the command for accessing the system memory (file system C) that is first mutual authenticated is referred to as a third command, the command for accessing the system memory (file system B) that is mutual authenticated next is referred to as a second command and the command for accessing the third mutual authenticated system memory (file system A) is referred to as a first command. The second command is embedded in the first command as a parameter. The third command is embedded in the second command as a parameter. The third command is encrypted by using an access key C, the second command is encrypted by using an access key B, and the first command is encrypted by using an access key A.

As shown in FIG. 19, the command packet 900 contains a PREAMBLE field 902 in which a packet preamble is indicated, a SYNC field 904 in which synchronization data are provided, a LEN_A field 906 in which the length of the entire packet (PACKET_DATA) is indicated, a PACKET_DATA field 908 in which the packet data are provided and a CRC field 910 in which a check code used for communication error detection is indicated.

The PACKET_DATA field 908 includes fields 912-916 for the file system A, fields 918-924 for the file system B and fields 926-932 for the file system C.

The fields for the file system A include a CMD_A field 912 in which a command (WritePlus/ReadPlus) for the file system A is indicated, an IDtc_A field 914 in which a byte string used for file system A identification is indicated and a PARAM_A field 916 in which the target data address in the file system A and the data to be written are indicated in correspondence to commands and the command processing results and the data having been read out are indicated in correspondence to responses.

The fields for the file system B include a LEN_B field 918 in which the length of the packet for the file system B is indicated, a CMD_B field 920 in which a command (Write/Read) for the file system B is indicated, an IDtc_B field 922 in which a byte string used for file system B identification is indicated and a PARAM_B field 924 in which the target data address in the file system B and the data to be written are indicated in correspondence to commands and the command processing results and the data having been read out are indicated in correspondence to responses.

The fields for the file system C include a LEN_C field 926 in which the length of the packet for the file system C is indicated, a CMD_C field 928 in which a command (Write/Read) for the file system C is indicated, an IDtc_C field 930 in which a byte string used for file system C identification is indicated and a PARAM_C field 932 in which the target data address in the file system C and the data to be written are indicated in correspondence to commands and the command processing results and the data having been read out are indicated in correspondence to responses.

It is to be noted that while the plurality of file systems adopts structures identical to one another in the example presented in FIG. 19, the present invention is not limited to this example. For instance, different common key encryption methods may be used together. In such a case, block encryption that uses a 64-bit key may be adopted in one of the file systems and block encryption that uses a 128-bit key may be adopted in another file system. By using encryption algorithms with the varying key lengths, services at different security levels can be offered together.

The memory access command described above disallows access by a third party who does not own the systems in the IC card 105 to any of the system internal memories. For instance, it is difficult for the third party to replace the memory command for accessing the file system A alone with another command when the packet is output from the controller A200.

Figure 20:
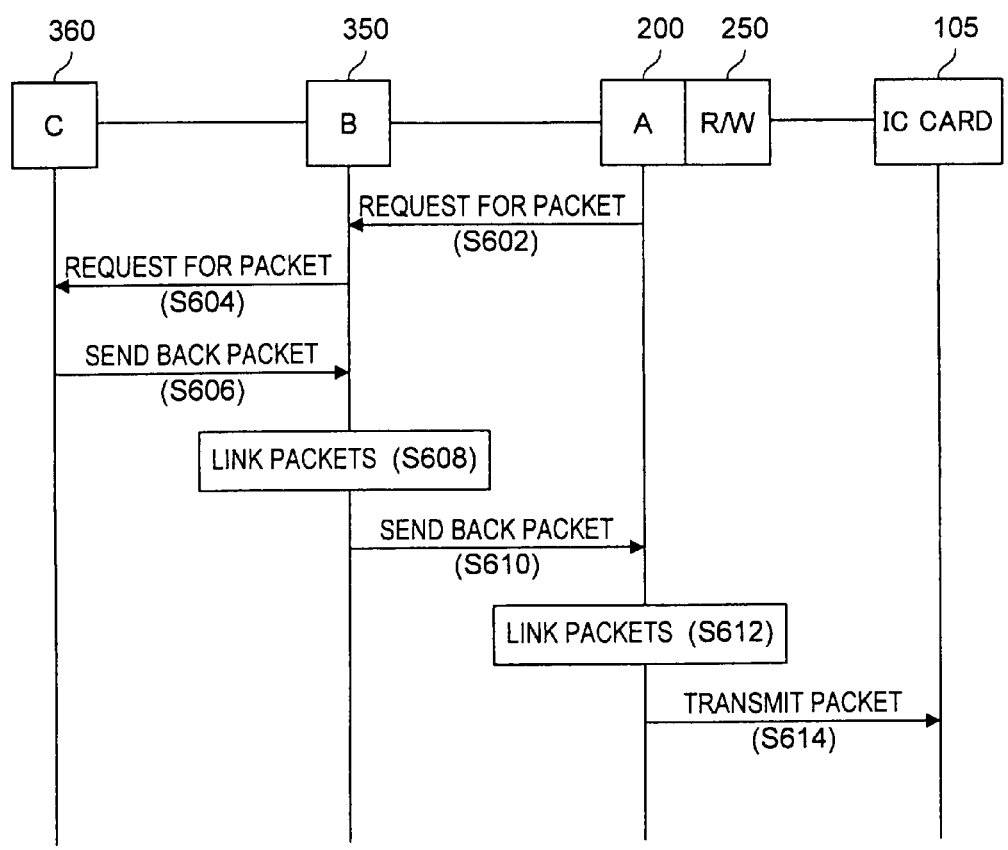
FIG. 20 presents a chart of the packet linking sequence.

FIG. 20 shows the sequence through which command packets to be transmitted from the higher-order controllers to the card are linked.

The controllers A, B and C generate the keys A, B and C in advance by executing mutual authentication with the card. The controller A waits for a R/W for communication with the card. The controller A issues a request for a packet to the controller B (step S602). The controller B issues a request for a packet to the controller C (step S604). The controller C transmits a packet encrypted with the key C to the controller B (step S606). The controller B links the packet from the controller C (step S608) and transmits the integrated packet encrypted with the key B to the controller A (step S610). The controller A links the packet transmitted from the controller B (step S612) and transmits the entire packet encrypted with the key A to the card (step S614).

Third Embodiment

Parallel Configuration

In the parallel configuration explained in reference to the embodiment, one of the three higher-order controllers engages in communication with the IC card and the other higher-order controllers engage in direct communication with the controller in communication with the IC card. The information processing system achieved in the embodiment includes an IC card 105, a controller A200 equipped with a Reader/Writer (R/W) 250, a controller B370 and a controller 380, as shown in FIG. 21.

Three system areas (to be referred to as file system A, file system B and file system C) are present in the IC card 105 in the embodiment. The IC card 105 is otherwise identical to the IC card explained in reference to the first embodiment. In addition, the controller A200 equipped with the Reader/Writer 250 is a controller corresponding to the file system A and is similar to the controller A200 (see FIG. 1) in the first embodiment.

Figure 21:
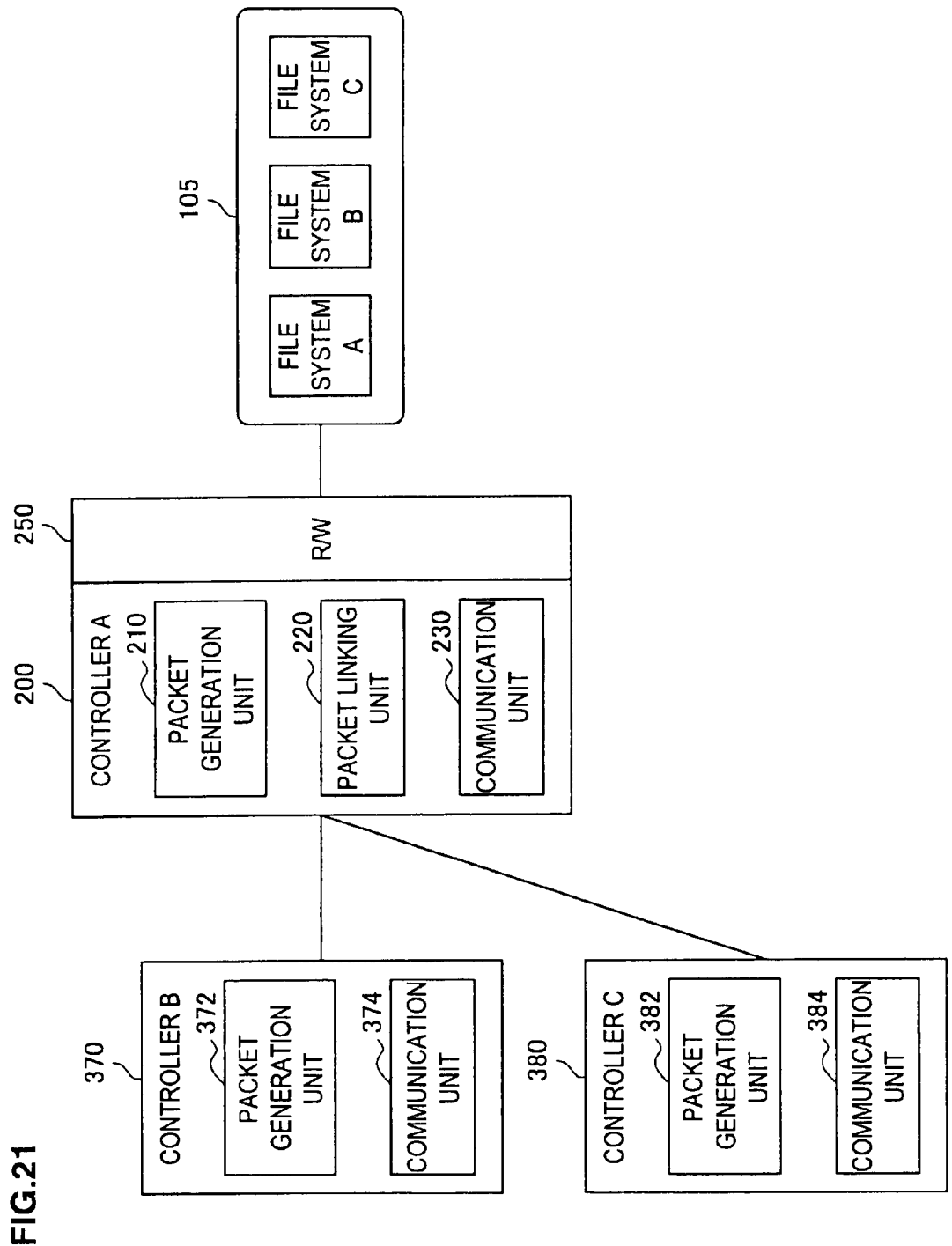
FIG. 21 illustrates the information processing system achieved in a third embodiment.

As shown in FIG. 21, the controller B370 includes a packet generation unit 372 that generates a command packet to be transmitted to the IC card 105 in relation to the file system B in the IC card 105 and a communication unit 374 that engages in communication with the controller A200. The communication unit 374 transmits the packet generated by the packet generation unit 372 to the controller A200.

As shown in FIG. 21, the controller C380 includes a packet generation unit 382 that generates a command packet to be transmitted to the IC card 105 in relation to the file system C in the IC card 105 and a communication unit 384 that engages in communication with the controller A200. The communication unit 384 transmits the packet generated by the packet generation unit 382 to the controller A200.

Figure 23:
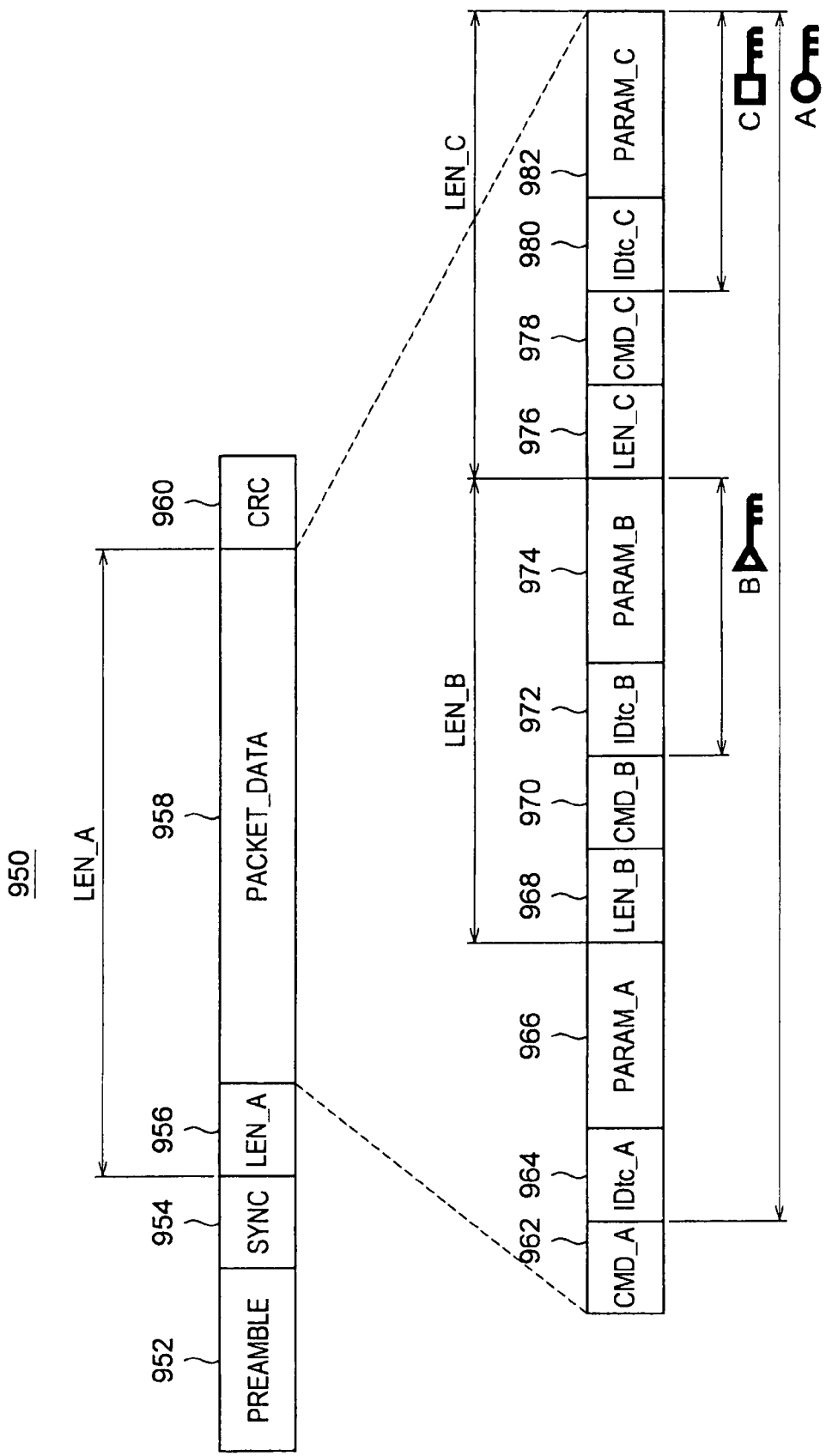
FIG. 23 illustrates a command packet.

FIG. 23 shows a command packet made up with a plurality of command packets linked therein. The command packet in FIG. 23 is generated by the packet linking unit 220 in the controller A200 shown in FIG. 21.

Figure 22:
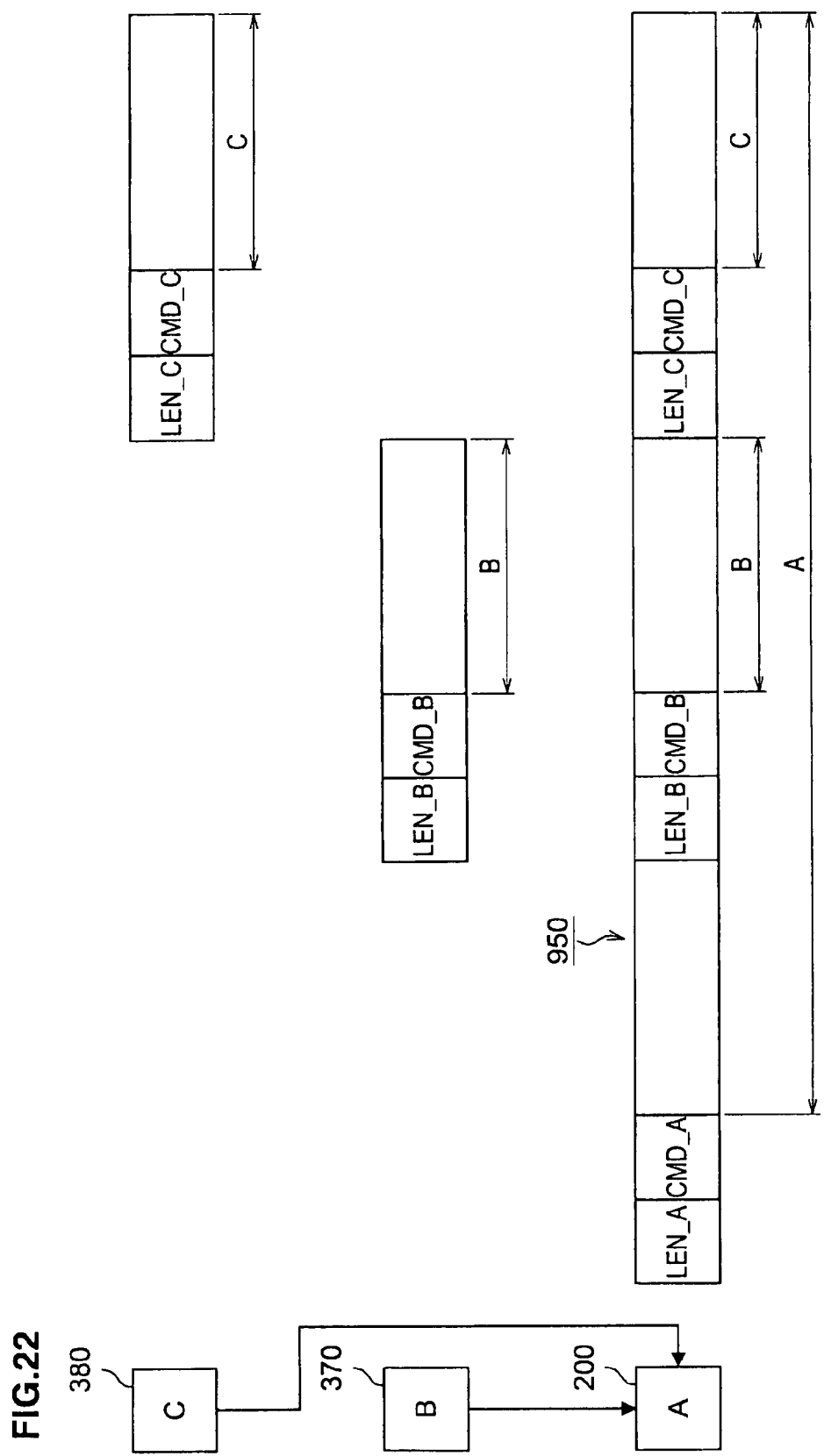
FIG. 22 illustrates alterations that occur in the packet structure.

FIG. 22 shows alterations occurring in the packet structure. As shown in FIG. 22, the packet linking unit 220 generates a single command packet by linking the packets generated by the packet generation unit 352 in the controller B370 and by the packet generation unit 382 in the controller C380 into the command packet generated by the packet generation unit 210 in the controller A. This command packet constitutes a command for accessing the system memories in the IC card 105 (hereafter referred to as a memory access command).

As shown in FIG. 23, the memory access command contains three commands for accessing the system memory in the IC card 105. In the following description, the command for accessing the system memory (file system C) that is first mutually authenticated is referred to as a third command, the command for accessing the system memory (file system B) that is mutually authenticated next is referred to as a second command and the command for accessing the third mutually authenticated system memory (file system A) is referred to as a first command. The second and third commands are embedded as parameters in the first command. The third command is encrypted by using an access key C, the second command is encrypted by using an access key B, and the first command is encrypted by using an access key A.

As shown in FIG. 23, the command packet 950 contains a PREAMBLE field 952 in which a packet preamble is indicated, a SYNC field 954 in which synchronization data are provided, a LEN_A field 956 in which the length of the entire packet (PACKET_DATA) is indicated, a PACKET_DATA field 958, in which the packet data are provided, and a CRC field 960 in which a check code used for communication error detection is indicated.

The PACKET_DATA field 958 includes fields 962-966 for the file system A, fields 968-974 for the file system B and fields 976-982 for the file system C.

The fields for the file system A include a CMD_A field 962 in which a command (WritePlus/ReadPlus) for the file system A is indicated, an IDtc_A field 964 in which a byte string used for file system A identification is indicated and a PARAM_A field 966 in which the target data address in the file system A and the data to be written are indicated in correspondence to commands and the command processing results and the data that have been read out are indicated in correspondence to responses.

The fields for the file system B include a LEN_B field 968 in which the length of the packet for the file system B is indicated, a CMD_B field 970 in which a command (Write/Read) for the file system B is indicated, an IDtc_B field 972 in which a byte string used for file system B identification is indicated and a PARAM_B field 974 in which the target data address in the file system B and the data to be written are indicated in correspondence to commands and the command processing results and the data that have been read out are indicated in correspondence to responses.

The fields for the file system C include a LEN_C field 976 in which the length of the packet for the file system C is indicated, a CMD_C field 978 in which a command (Write/Read) for the file system C is indicated, an IDtc_C field 980 in which a byte string used for file system C identification is indicated and a PARAM_C field 982 in which the target data address in the file system C and the data to be written are indicated in correspondence to commands and the command processing results and the data that have been read out are indicated in correspondence to responses.

It is to be noted that while the plurality of file systems adopt structures identical to one another in the example presented in FIG. 23, the present invention is not limited to this example. For instance, different common key encryption methods may be used together. In such a case, block encryption that uses a 64-bit key may be adopted in one of the file systems and block encryption that uses a 128-bit key may be adopted in another file system. By using encryption algorithms with the varying key lengths, services at different security levels can be offered together.

The memory access command described above disallows access by a third party who does not own the systems in the IC card 105 to any of the system internal memories. For instance, it is difficult for the third party to replace the memory command for accessing the file system A alone with another command when the packet is output from the controller A200.

Figure 24:
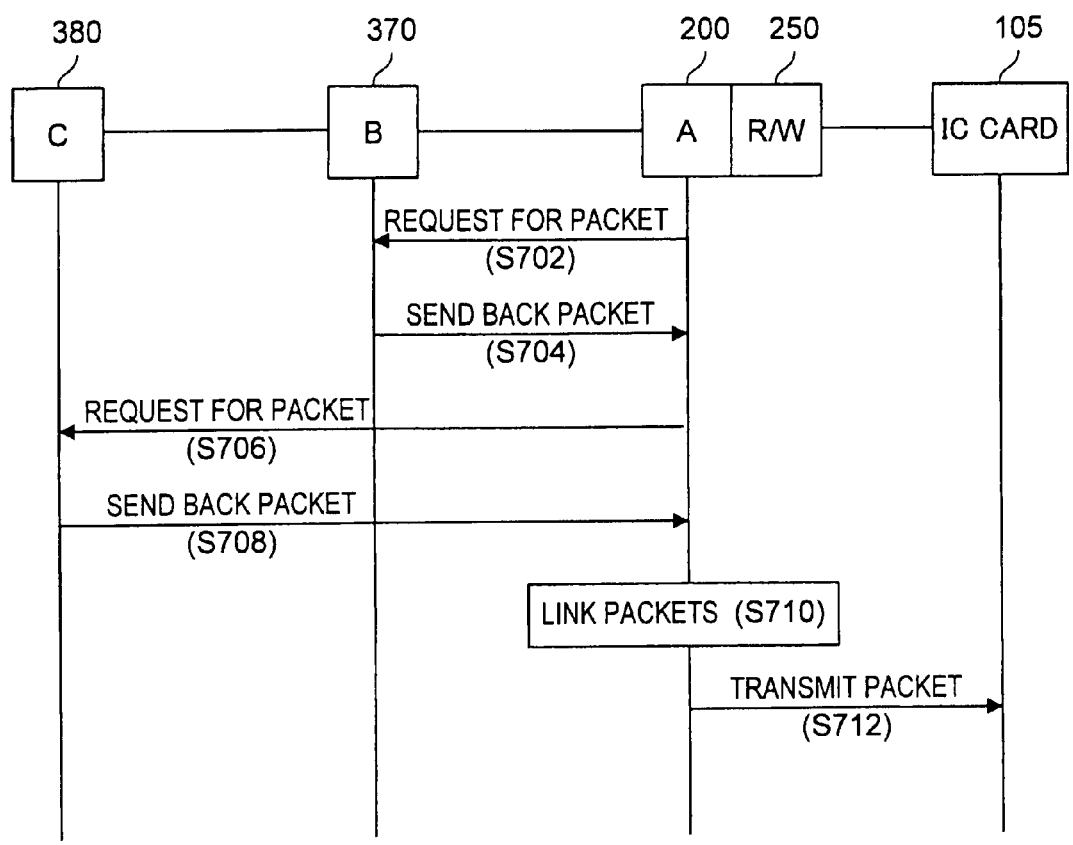
FIG. 24 presents a chart of the packet linking sequence.
Figure 25:
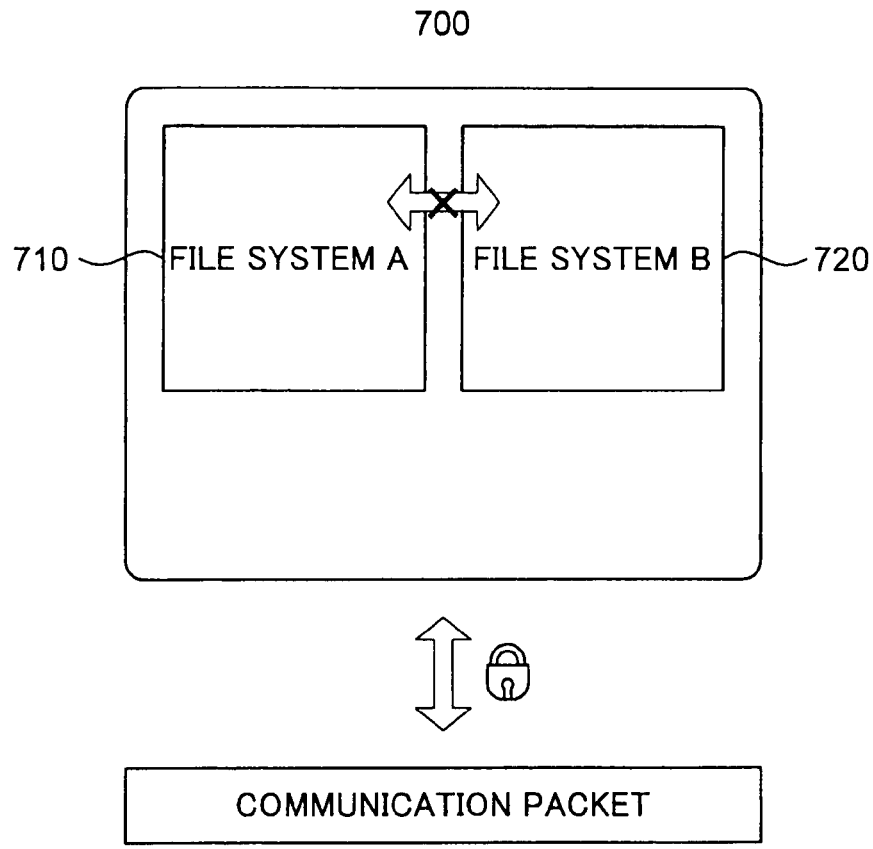
FIG. 25 illustrates an IC card in the related art.

FIG. 24 shows the sequence through which command packets to be transmitted from the higher-order controllers to the card are linked.

The controllers A, B and C generate the keys A, B and C in advance by executing mutual authentication with the card. The controller A waits for a R/W for communication with the card. The controller A issues a request for a packet to the controller B (step S702). The controller B transmits a packet encrypted with the key B to the controller A (step S704). The controller A issues a request for a packet to the controller C (step S706). The controller C transmits a packet encrypted with the key C to the controller A (step S708). The controller A links the packet transmitted from the controller B and the packet transmitted from the controller C (step S710) and transmits the entire packet encrypted with the key A to the card (step S712).

It should be understood by those skilled in the art that various modification, combinations, subcombinations and alterations may occur depending on design requirements and other factors insofar as they are within the scope of the appended claims or the equivalents thereof.

For instance, while an explanation is given above in reference to the second and third embodiments on an example in which three system areas are present in the card, the present invention is not limited to this example. Namely, the present invention may be adopted in conjunction with a card containing four or more system areas with higher-order controllers each engaged in operation in correspondence to one of the file systems. More specifically, the four or more higher-order controllers connected in series or in parallel or connected in a configuration that includes an arbor cherry combination of serial connection and parallel connection may be enabled to communicate with one another according to the present invention.

The present invention may be adopted in an information processing system, an information processing apparatus and an integrated circuit chip, and more specifically, it may be adopted in a technology related to an integrated circuit chip (IC card) containing a plurality of file systems, through which the initial state is restored by reverting a system internal memory having already been overwritten to the initial condition if some of the system internal memories may not be overwritten due to, for instance, a power-out while overwriting the memories (system internal memories) in the plurality of file systems in response to a single command.

The present document contains subject matter related to Japanese Patent Application JP 2006-151435 filed in the Japanese Patent Office on May 31, 2006, and Japanese Patent Application JP 2006-86188 filed in the Japanese Patent Office on Mar. 27, 2006, the entire contents of which are incorporated herein by reference.

What is claimed is:

1. An information processing system comprising:
   an integrated circuit chip having stored therein a plurality of file systems;
   a first information processing apparatus that engages in communication with the integrated circuit chip and processes information; and
   a second information processing apparatus that engages in communication with the first information processing apparatus and processes information, wherein:

the first information processing apparatus includes:
a first command packet generation unit that generates a first command packet;
a command packet linking unit that generates a single linked command packet by linking a second command packet generated by the second information processing apparatus within the first command packet; and
a first command packet transmission unit that transmits the linked command packet to the integrated circuit chip to be directed to the plurality of file systems,
wherein the first command packet contains a first command to access a first file system in the integrated circuit chip;
the second information processing apparatus includes:
a second command packet generation unit that generates the second command packet; and
a second command packet transmission unit that transmits the second command packet to the first information processing apparatus,
wherein the second command packet contains a second command to access a second file system in the integrated circuit chip.

2. The information processing system according to claim 1, wherein:
the second command is embedded as a parameter in the first command in the linked command packet.

3. The information processing system according to claim 1, wherein:
the integrated circuit chip separates the single linked command packet containing the first and second command packets linked therein into individual command packets, transfers the first and second command packets that have become separated from each other to the corresponding file systems and generates a single linked response packet by linking first and second responses from the first and second systems;
the first response packet contains a first response from the first file system;
the second response packet contains a second response from the second file system; and
the second response is embedded as a parameter in the first response in the linked response packet.

4. The information processing system according to claim 1, wherein:
the integrated circuit chip is mounted in an IC card.

5. An information processing apparatus that engages in communication with an integrated circuit chip having stored therein a plurality of file systems and processes information, comprising:
a command packet generation unit that generates a first command packet;
a command packet linking unit that generates a single linked command packet by linking a second command packet having been generated by and transmitted from another information processing apparatus within the first command packet; and
a command packet transmission unit that transmits the linked command packet to the integrated circuit chip to be directed to the plurality of file systems therein,
wherein the first command packet contains a first command to access a first file system in the integrated circuit chip, and
wherein the second command packet contains a second command to access a second file system in the integrated circuit chip.

6. The information processing apparatus according to claim 5, wherein:
the second command is embedded as a parameter in the first command in the linked command packet.

7. The information processing apparatus according to claim 5, wherein:
the integrated circuit chip is mounted in an IC card.

8. An integrated circuit chip equipped with a memory in which a plurality of file systems are stored, comprising:
a memory that includes a plurality of system areas where first and second file systems are stored and a system coordination data area where management data to be used for all file systems are stored; and
a control unit that controls data in the first and second file systems based upon the system coordination data, wherein:
the control unit separates a single command packet achieved by linking a first command packet and a second command packet corresponding to the first file system and the second file system respectively, transfers the command packets that have become separated to the corresponding file systems and generates a single linked response packet by linking first and second response packets from the first and second file systems,
wherein the first command packet contains a first command to access the first file and wherein the second command packet contains a second command to access the second file system;
the first response packet contains a first response from the first file system;
the second response packet contains a second response from the second file system; and
the second response is embedded as a parameter in the first response in the linked response packet.

9. The integrated circuit chip according to claim 8, wherein:
the file systems each comprise:
a system internal memory where the data in the corresponding file system are stored;
a memory management unit that manages the system internal memory;
a command processing unit that accesses the system internal memory via the memory management unit and sets response data in a response packet; and
an encryption processing unit that executes encryption processing on the command packet and the response packet.

10. The integrated circuit chip according to claim 8, wherein:
the control unit generates a single linked response packet by linking the first response packet and the second response packet from the first file system and the second file system, and updates the management data used in conjunction with all file systems stored within the system coordination data area.

11. The integrated circuit chip according to claim 8, wherein:
access by any file system to another file system among said plurality of file systems is disallowed.

12. An information processing system, comprising:
an integrated circuit chip having stored therein a plurality of file systems;
a first information processing apparatus that engages in communication with the integrated circuit chip and processes information;
a second information processing apparatus that engages in communication with the first information processing apparatus and processes information; and a third information processing apparatus that engages in communication with the second information processing apparatus and processes information, wherein:

the first information processing apparatus includes:

a first command packet generation unit that generates a first command packet;

a command packet linking unit that generates a single linked command packet by linking a second command packet generated by the second information processing apparatus within the first command packet; and a first command packet transmission unit that transmits the linked command packet to the plurality of file systems of the integrated circuit chip, wherein the first command packet contains a first command to access a first file system in the integrated circuit chip;

the second information processing apparatus includes:

a second command packet generation unit that generates the second command packet;

a command packet linking unit that generates a single linked command packet by linking a third command packet generated by the third information processing apparatus within the second command packet; and a second command packet transmission unit that transmits the linked command packet to the first information processing apparatus, wherein the second command packet contains a second command to access a second file system in the integrated circuit chip; and the third information processing apparatus includes;

a third command packet generation unit that generates the third command packet; and a third command packet transmission unit that transmits the third command packet to the second information processing apparatus;

wherein the third command packet contains a third command to access a third file system in the integrated circuit chip.

13. The information processing system according to claim 12, wherein:

the second command is embedded as a parameter in the first command and the third command is embedded as a parameter in the second command in the linked command packet.

14. The information processing system according to claim 12, wherein:

the integrated circuit chip separates the single linked command packet containing the first to third command packets linked therein into individual command packets, transfers the first to third command packets that have become separated from one another to the corresponding file systems and generates a single linked response packet by linking first to third response packets from the plurality of file systems;

the first response packet contains a first response from the first file system;

the second response packet contains a second response from the second file system;

the third response packet contains a third response from the third file system; and the second response is embedded as a parameter in the first response and the third response is embedded as a parameter in the second response in the linked response packet.

15. The information processing system according to claim 12, wherein:

the integrated circuit chip is mounted in an IC card.

16. An information processing system, comprising:

an integrated circuit chip having stored therein a plurality of file systems;

a first information processing apparatus that engages in communication with the integrated circuit chip and processes information; and second and third information processing apparatuses that engage in communication with the first information processing apparatus and process information, wherein:

the first information processing apparatus includes:

a first command packet generation unit that generates a first command packet;

a command packet linking unit that generates a single linked command packet by linking a second command packet and a third command packet respectively generated by the second information processing apparatus and the third information processing apparatus within the first command packet; and a first command packet transmission unit that transmits the linked command packet to the plurality of file systems of the integrated circuit chip, wherein the first command packet contains a first command to access a first file system in the integrated circuit chip;

the second information processing apparatus includes:

a second command packet generation unit that generates the second command packet; and a second command packet transmission unit that transmits the second command packet to the first information processing apparatus, wherein the second command packet contains a second command to access a second file system in the integrated circuit chip; and the third information processing apparatus includes:

a third command packet generation unit that generates the third command packet; and a third command packet transmission unit that transmits the third command packet to the first information processing apparatus, wherein the third command packet contains a third command to access a third file system in the integrated circuit chip.

17. The information processing system according to claim 16, wherein:

the second command and the third command are embedded as parameters in the first command in the linked command packet.

18. The information processing system according to claim 16, wherein:

the integrated circuit chip separates the single linked command packet containing the first to third command packets linked therein into individual command packets, transfers the first to third packets that have become separated from one another to the corresponding file systems and generates a single linked response packet by linking first to third response packets from the first to third file systems;

the first response packet contains a first response from the first file system;

the second response packet contains a second response from the second file system;

the third response packet contains a third response from the third file system; and the second response and the third response are embedded as parameters in the linked response packet.

19. The information processing system according to claim 16, wherein:
the integrated circuit chip is mounted in an IC card.

20. An information processing system comprising:
an integrated circuit chip having stored therein a plurality of file systems;
a first information processing apparatus that engages in communication with the integrated circuit chip and processes information; and
second to nth information processing apparatuses (n is an integer equal to or greater than 2) that engage in communication with the first information processing apparatus and process information, wherein:
the first information processing apparatus includes:
a first command packet generation unit that generates a first command packet;
a command packet linking unit that generates a single linked command packet by linking second to nth command packets respectively generated by the second to nth information processing apparatuses within the first command packet; and
a first command packet transmission unit that transmits the linked command packet to the plurality of file systems of the integrated circuit chip; and
a kth information processing apparatus (k is an integer equal to or greater than 2 and equal to or less than n) includes:
a kth command packet generation unit that generates a kth command packet; and
a kth command packet transmission unit that transmits the kth command packet to the first information processing apparatus
wherein the kth command packet (k is an integer equal to or greater than 1 and equal to or less than n) contains a kth command to access a kth file system in the integrated circuit chip.

21. The information processing system according to claim 20, wherein:
the kth command (k is an integer equal to or greater than 2 and equal to or less than n) is embedded as a parameter in the first command in the linked command packet.

22. The information processing system according to claim 20, wherein:
the integrated circuit chip separates the single linked command packet containing the first to nth command packets linked therein into individual command packets, transfers the first to nth command packets that have become separated from one another to the corresponding file systems and generates a single linked response packet by linking first to nth response packets from the first to nth file systems;
the kth (k is an integer equal to or greater than 1 and equal to or less than n) response packet contains a kth response from the kth file system; and
the kth (k is an integer equal to or greater than 2 and equal to or less than n) response is embedded as a parameter in the first response in the linked response packet.

23. The information processing system according to claim 20, wherein:
the integrated circuit chip is mounted in an IC card.

* * * * *